US011833768B2

(12) United States Patent
Widdle

(10) Patent No.: US 11,833,768 B2
(45) Date of Patent: Dec. 5, 2023

(54) LIQUID SHIM INJECTION DEVICES AND METHODS FOR INJECTING LIQUID SHIM MATERIAL BETWEEN ADJACENT COMPONENTS

(71) Applicant: The Boeing Company, Chicago, IL (US)

(72) Inventor: Richard Dean Widdle, Carnation, WA (US)

(73) Assignee: The Boeing Company, Arlington, VA (US)

(*) Notice: Subject to any disclaimer, the term of this patent is extended or adjusted under 35 U.S.C. 154(b) by 38 days.

(21) Appl. No.: 17/475,066

(22) Filed: Sep. 14, 2021

(65) Prior Publication Data

US 2022/0184904 A1 Jun. 16, 2022

Related U.S. Application Data

(60) Provisional application No. 63/124,303, filed on Dec. 11, 2020.

(51) Int. Cl.

*B29C 70/84* (2006.01)
*F16J 15/40* (2006.01)
*B29L 31/30* (2006.01)

(52) U.S. Cl.

CPC ............. *B29C 70/845* (2013.01); *F16J 15/40* (2013.01); *B29L 2031/3085* (2013.01)

(58) Field of Classification Search

CPC ...... F16J 15/14; B29C 45/0001; B29C 65/48; B29C 65/542; B05C 5/0204; B05C 7/00; B05C 17/00516; B05D 1/26

See application file for complete search history.

(56) References Cited

U.S. PATENT DOCUMENTS 5,358,397 A * 10/1994 Ligon ..................... B30B 11/24 264/177.17
5,752,657 A * 5/1998 Hogan .................. B05B 3/1021 239/223
2004/0099699 A1* 5/2004 Zubeck .................... F16J 15/14 222/527

FOREIGN PATENT DOCUMENTS

WO WO-2021202749 A1 * 10/2021 ........... B05C 17/002

* cited by examiner

*Primary Examiner* — Matthew J Daniels
*Assistant Examiner* — Hana C Page
(74) *Attorney, Agent, or Firm* — Yee & Associates, P.C.

(57) ABSTRACT

Liquid shim injection devices and methods for injecting liquid shim material into a gap between adjacent components of an assembly. The liquid shim injection devices comprise a body, which comprises an injection shaft, a liquid shim conduit defined within the body and configured to channel liquid shim material within the injection shaft, and a fluid-permeable region formed along the injection shaft, an actuated fluid seal operably coupled to the injection shaft and configured to be selectively conformed among a plurality of conformations, and a fluid seal actuator assembly configured to transition the actuated fluid seal among the plurality of conformations. Methods comprise inserting the injection shaft into a bore that extends through the adjacent components of the assembly, forming a fluid seal between the liquid shim injection device and an interior component of the assembly, and flowing the liquid shim material from the liquid shim injection device into the gap.

25 Claims, 5 Drawing Sheets

LIQUID SHIM INJECTION DEVICES AND METHODS FOR INJECTING LIQUID SHIM MATERIAL BETWEEN ADJACENT COMPONENTS

RELATED APPLICATION

The present application is a non-provisional of and claims priority to U.S. Provisional Patent Application No. 63/124,303, filed on Dec. 11, 2020, entitled "LIQUID SHIM INJECTION DEVICES AND METHODS FOR INJECTING LIQUID SHIM MATERIAL BETWEEN ADJACENT COMPONENTS," the complete disclosure of which is incorporated by reference.

FIELD

The present disclosure relates to liquid shim injection devices and methods for injecting liquid shim material between adjacent components.

BACKGROUND

Generally speaking, a shim is a material or a body that is used to fill a gap that separates adjacent components of an assembly or a structure. In particular, shims may be utilized to mitigate weaknesses caused by gaps separating adjacent components that are mechanically fastened to one another. A shim may include a variety of materials and configurations depending on the particular application. As examples, a shim may include a solid shim such as an insert, a washer, or a sheet that is inserted or otherwise positioned in the gap between the adjacent components. A shim also may include liquid shim material that is utilized to fill the gap, and in some instances, the liquid shim material is hardened to form a solid shim.

During construction of the assembly, a solid shim often is inserted into the gap after the adjacent components have been positioned relative to one another, which can require access to a spatially confined area when the gap is obscured by one or more of the adjacent components or other portions of the assembly. When liquid shim materials are used, the liquid shim material frequently is applied to either or both of the adjacent components before the adjacent components are positioned relative to one another. Generally, an excess of liquid shim material generally is applied, such that when the adjacent components are positioned relative to one another, the liquid shim material fills the gap and any excess liquid shim material is squeezed out from between the adjacent components. Often, the excess liquid shim material must be removed from the assembly once the adjacent components are positioned, which again can require access to a spatially confined space.

Moreover, liquid shim materials often must be carefully selected to possess a particular viscosity and/or handling time such that the liquid shim materials may flow once the adjacent components are brought together, remain localized to the applied area after being applied, and/or will not harden undesirably before the adjacent components are brought together. Thus, a need exists for improved devices and methods for applying liquid shim material to gaps between adjacent components of assemblies that may not require access to spatially confined spaces and/or may permit the liquid shim material to be applied after the adjacent components are positioned relative to one another.

SUMMARY

Liquid shim injection devices and methods for injecting liquid shim material into a gap between adjacent components of an assembly are disclosed herein. The liquid shim injection devices comprise a body, which comprises an injection shaft, a liquid shim conduit defined within the body and configured to channel liquid shim material within the injection shaft, and a fluid-permeable region formed along the injection shaft and configured to provide fluid communication between the liquid shim conduit and an exterior to the injection shaft. The liquid shim injection devices also comprise an actuated fluid seal operably coupled to the injection shaft and configured to be selectively conformed among a plurality of conformations that include a translation conformation and a sealing conformation, in which the actuated fluid seal has an outermost lateral seal-dimension that is greater in the sealing conformation than in the translation conformation. The liquid shim injection devices further comprise a fluid seal actuator assembly associated with the actuated fluid seal and configured to selectively and operably transition the actuated fluid seal among the plurality of conformations.

The methods comprise inserting an injection shaft of the liquid shim injection device into a bore that extends through the adjacent components of the assembly, forming a fluid seal between the liquid shim injection device and an interior component of the assembly, and flowing the liquid shim material from the liquid shim injection device into the gap.

DESCRIPTION

FIGS. 1-5 provide examples of liquid shim injection devices 100, assemblies 200 including a gap between adjacent components where liquid shim injection devices 100 may inject liquid shim material, and methods 500 for injecting liquid shim material into a gap between adjacent components of an assembly, according to the present disclosure.

Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure. Additionally, in the figures, environment, or environmental structures may be illustrated in dotted lines to indicate that these structures, elements, or components are not included in, do not form portions of, or are environment to liquid shim injection devices 100. Dash-dot lines may be utilized in the figures to illustrate alternative configurations, conformations, positions, and/or orientations of a given element, structure, and/or assembly of liquid shim injection devices 100, and the configurations, conformations, positions, or orientations illustrated in dash-dot lines may be, but are not necessarily, optional conformations, positions, or orientations to liquid shim injection devices 100.

Figure 1:
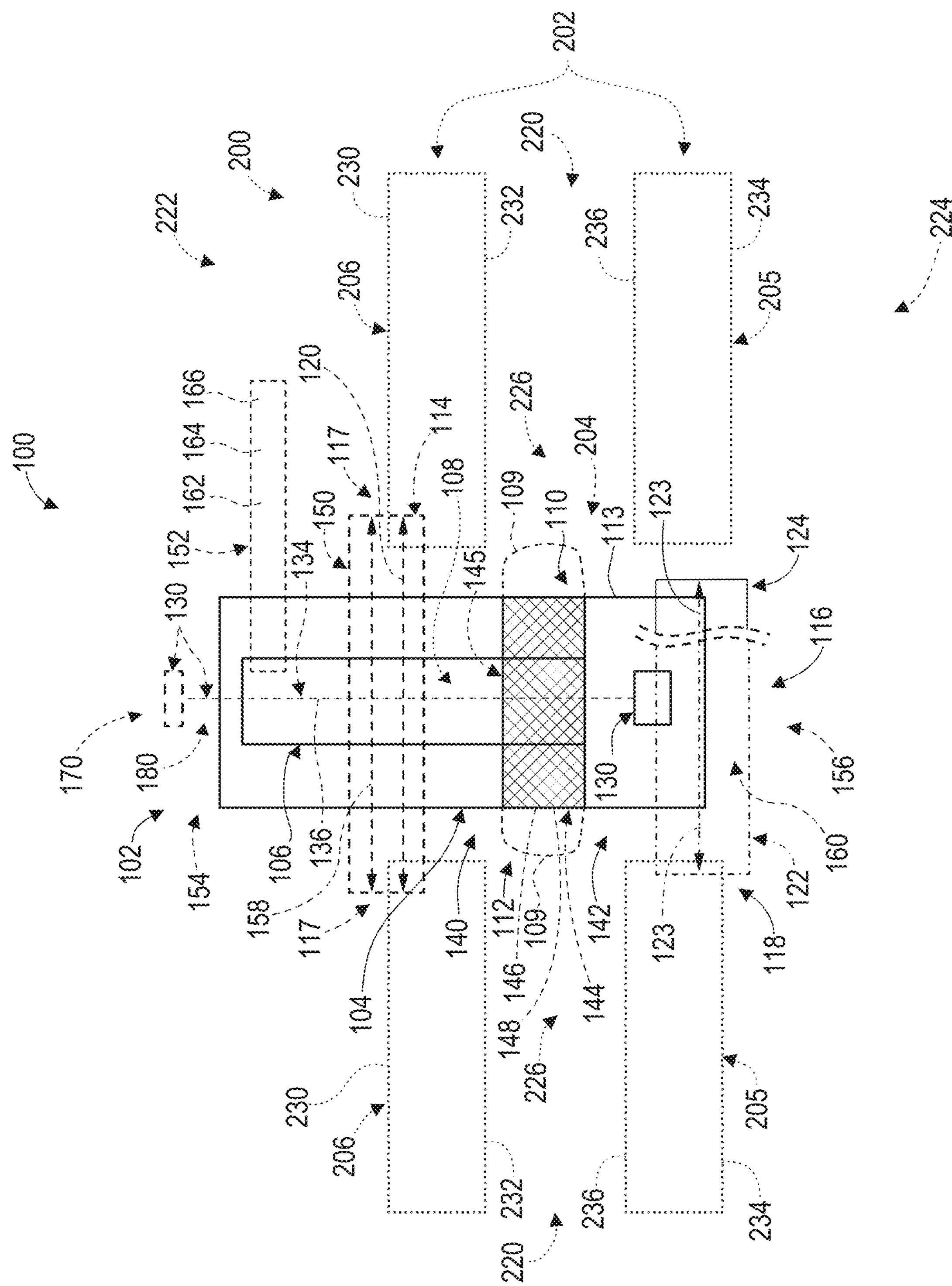
FIG. 1 is schematic illustration representing examples of liquid shim injection devices according to the present disclosure.

With initial reference to FIG. 1, illustrated therein is a schematic representation of examples of liquid shim injection devices 100 according to the present disclosure. As shown, liquid shim injection devices 100 comprise a body 102 that comprises an injection shaft 104 and a liquid shim conduit 106. Liquid shim conduit 106 is defined within body 102 and is configured to channel a liquid shim material 108 within injection shaft 104. Body 102 also includes a fluid-permeable region 110 formed along injection shaft 104 that is configured to provide fluid communication between liquid shim conduit 106 and an exterior 112 to, or the outside of, injection shaft 104.

Liquid shim injection devices 100 further include an actuated fluid seal 116 that is operably coupled to injection shaft 104 and configured to be selectively transitioned among a plurality of conformations. In particular, the plurality of conformations of actuated fluid seal 116 includes a sealing conformation 122 and a translation conformation 124. Actuated fluid seal 116 has an outermost lateral seal-dimension 123, such as the diameter of the actuated fluid seal 116 and/or the furthest extent of actuated fluid seal 116 transverse or perpendicular to a length of injection shaft 104. Outermost lateral seal-dimension 123 is greater when actuated fluid seal 116 is in sealing conformation 122 than when actuated fluid seal 116 is in translation conformation 124. In other words, actuated fluid seal 116 has an outermost lateral seal-dimension 123 that is greater in the sealing conformation 122 than in the translation conformation 124, and actuated fluid seal 116 is configured to be transitioned between sealing conformation 122 and translation conformation 124 to change outermost lateral seal-dimension 123. Sealing conformation 122 is shown in dash-dot lines in FIG. 1, and translation conformation 124 is shown in solid lines in FIG. 1.

Liquid shim injection devices 100 further include a fluid seal actuator assembly 130 that is associated with actuated fluid seal 116 and configured to selectively and operably transition actuated fluid seal 116 among the plurality of conformations. Fluid seal actuator assembly 130 additionally or alternatively may be described as being configured to actuate actuated fluid seal 116. More specifically, fluid seal actuator assembly 130 is configured to selectively and operably transition actuated fluid seal 116 between and/or among sealing conformation 122 and translation conformation 124. In some examples, liquid shim injection device 100 further includes a fluid barrier 114 that is operably coupled to body 102 and configured to form a flow barrier, for example, with an exterior component 206, such as discussed in more detail herein.

Liquid shim injection devices 100 may be described as defining a proximal portion 140 and a distal portion 142 that are separated from one another by fluid-permeable region 110. Actuated fluid seal 116 is positioned within and/or forms a portion of distal portion 142, and when included, fluid barrier 114 is positioned within and/or forms a portion of proximal portion 140. Stated differently, in some examples, fluid-permeable region 110 is positioned between fluid barrier 114 and actuated fluid seal 116.

In some examples, fluid-permeable region 110 is configured to extrude liquid shim material 108 in an outward direction from injection shaft 104 and/or towards exterior 112 to, or the outside of, injection shaft 104. Actuated fluid seal 116 is configured to at least partially confine, direct, or guide an extruded liquid shim material 109 that is extruded from fluid-permeable region 110, at least when actuated fluid seal 116 is in sealing conformation 122. When liquid shim injection devices 100 include fluid barrier 114, actuated fluid seal 116 and fluid barrier 114 are configured to confine extruded liquid shim material 109 to within a defined region exterior to injection shaft 104.

For example, as shown in FIG. 1, in some examples, liquid shim injection devices 100 are configured to inject liquid shim material 108 into a gap 220 between adjacent components 202 of an assembly 200. In some such examples, assembly 200 includes a bore 204 that extends through adjacent components 202, and injection shaft 104 is configured to be inserted into bore 204. More specifically, in some examples, assembly 200 defines an exterior region 222 and an interior region 224 that are separated from one another by adjacent components 202. In some examples, injection shaft 104 of liquid shim injection devices 100 is configured to be inserted into, or operably positioned within, bore 204 from exterior region 222.

Adjacent components 202 may include an exterior component 206 that is positioned proximate exterior region 222, and an interior component 205 that is positioned proximate interior region 224 and/or closer to interior region 224 than exterior component 206. In some examples, bore 204 extends through exterior component 206 and interior component 205, such that bore 204 extends between exterior region 222 and interior region 224. In some examples, adjacent components 202 of assembly 200 are components that are to be joined by a fastener, in which the fastener may be inserted through bore 204 and engaged with interior component 205 and exterior component 206 to mechanically fasten interior component 205 and exterior component 206 to one another. Examples of the fastener include one or more of a bolt, a screw, a nut, a peg, a ring, a gasket, an o-ring, a spacer, a washer, a rivet, a lockbolt, and/or combinations thereof. Adjacent components 202 may be constructed of any suitable material, depending on the application. As examples, adjacent components 202 are constructed of a metal, such as an aluminum or titanium alloy, a plastic material, and/or a composite material, such as a fiber reinforced plastic. Interior component 205 and exterior component 206 need not be constructed of the same material.

In some examples, it is desirable to fill gap 220 between adjacent components 202 with a structural shim, such as a hardened, solidified, set, and/or cured liquid shim material, to improve the strength of interior component 205 and/or exterior component 206 proximate bore 204, to prevent deformation of interior component 205 and/or exterior component 206 proximate bore 204, to improve load distribution or load transfer between interior component 205 and exterior component 206, and/or to reduce stress concentrations in the fastener, and/or in interior component 205 and/or exterior component 206 proximate bore 204, once interior component 205 and exterior component 206 are fastened to one another. Thus, in some examples, liquid shim injection devices 100 are configured to inject liquid shim material 108 into gap 220 to fill a region of gap 220 that surrounds bore 204 with extruded liquid shim material 109, which subsequently may be set, hardened, solidified, and/or cured to form a structural shim.

In some examples, liquid shim injection devices 100 are configured to fill an annular region 226 within gap 220 that surrounds bore 204. More specifically, in some examples, annular region 226 have an annular diameter, or outermost lateral extent, that corresponds to, is at least as large as, or larger than, a diameter of, or an outermost lateral extent of, an area of exterior component 206 and/or interior component 205 that is engaged or contacted by the fastener. As an example, the area of exterior component 206 or interior component 205 that is engaged by the fastener corresponds to the contact area of a washer of the fastener that operably contacts an exterior-facing surface 230 of exterior component 206 and/or an interior-facing surface 234 of interior component 205. That said, in some examples, the annular region 226 or the region of gap 220 filled with extruded liquid shim material 109 by liquid shim injection device 100 are not be perfectly symmetrical or do not have a circular cross-section. The "diameter" of annular region 226 additionally or alternatively includes the outermost lateral extent of volumes having non-circular cross sections.

As shown in FIG. 1, in some examples, fluid-permeable region 110 is positioned along injection shaft 104 such that at least a portion of fluid-permeable region 110 is positioned within gap 220 when injection shaft 104 is positioned operably within bore 204. In some examples, actuated fluid seal 116 is configured to form a fluid seal 118 with interior component 205 when injection shaft 104 is positioned operably within bore 204. More specifically, in some examples, actuated fluid seal 116 is configured to form fluid seal 118 with interior component 205 when actuated fluid seal 116 is in the sealing conformation 122, and actuated fluid seal 116 is configured to be inserted through and/or translated within bore 204 when actuated fluid seal 116 is in translation conformation 124. Stated differently, when actuated fluid seal 116 is in translation conformation 124, injection shaft 104 may be inserted within, removed from within, and/or translated within bore 204. In some examples, actuated fluid seal 116 is operably coupled to injection shaft 104 such that at least a portion of actuated fluid seal 116 is positioned adjacent interior component 205 when injection shaft 104 is positioned operably within bore 204.

As discussed herein, injection shaft 104 being "positioned operably" within bore 204 may refer to one or more desired positions, or range of positions, in which liquid shim injection device 100 is positioned to inject liquid shim material 108 into gap 220 between adjacent components 202. In some examples, liquid shim injection device 100 is configured to flow liquid shim material 108 through fluid-permeable region 110 into gap 220 to inject, deposit, or fill at least a region of gap 220 that surrounds bore 204 with extruded liquid shim material 109. When actuated fluid seal 116 is in sealing conformation 122, actuated fluid seal 116 may form fluid seal 118 with interior component 205 that confines extruded liquid shim material 109 to within gap 220, prevents extruded liquid shim material 109 from flowing to within bore 204 formed in interior component 205, and/or prevents extruded liquid shim material 109 from flowing to interior region 224. Similarly, in examples when liquid shim injection devices 100 include fluid barrier 114, fluid barrier 114 is configured to form a flow barrier 117 with exterior component 206, and flow barrier 117 may confine extruded liquid shim material 109 within gap 220, prevent extruded liquid shim material 109 from flowing to within bore 204 formed in exterior component 206, and/or prevent extruded liquid shim material 109 from flowing to exterior region 222.

As discussed in more detail herein, in some examples, exterior region 222 is physically more accessible and/or less physically constrained to access than interior region 224. With this in mind, exterior region 222 additionally or alternatively may be referred to as accessible region 222 and interior region 224 additionally or alternatively may be referred to as inaccessible region 224. In some examples, exterior component 206 is physically more accessible than interior component 205. In particular, in some examples, exterior component 206 obscures, blocks, and/or at least partially partitions interior component 205 and/or gap 220 from being accessed from exterior region 222, with the exception of accessing interior component 205 and/or gap 220 from exterior region 222 via bore 204. Thus, exterior component 206 additionally or alternatively may be referred to herein as accessible component 206, interior component 205 additionally or alternatively may be referred to as inaccessible component 205, and gap 220 additionally or alternatively may be referred to as inaccessible gap 220. In view of the above, liquid shim injection device 100 may be described as being configured to form fluid seal 118 with inaccessible component 205 from accessible region 222 and/or as being configured to flow liquid shim material 108 into inaccessible gap 220 from accessible region 222.

Adjacent components 202 additionally or alternatively includes more than two components, which may be arranged in any suitable manner and/or orientation relative to one another. In some examples, adjacent components 202 includes one or more components that are positioned within gap 220. Additionally or alternatively, exterior component 206 and/or interior component 205 are comprised of a plurality of subcomponents and/or portions, with additional gaps optionally being formed between them. In some examples, adjacent components 202 includes a plurality of interior components 205 that are separated from one another by a plurality of corresponding gaps 220, and bore 204 extends through exterior component 206 and through the plurality of interior components 205. As examples, adjacent components 202 include at least 2, at least 3, at least 4, at least 5, and/or at most 6 interior components 205 and at least 1, at least 2, at least 3, at least 4, and/or at most 5 corresponding gaps 220 separate the interior components 205. In such examples, the interior component 205 positioned nearest exterior component 206 may be referred to as a first interior component or as an exterior-most interior component, and liquid shim injection devices 100 is configured to inject liquid shim material 108 into gap 220 separating exterior component 206 and the first interior component, as well as any suitable number of additional gaps that separate the first interior component from an additional interior component and/or two or more additional interior components from one another. In some such examples, actuated fluid seal 116 is configured to form a fluid seal 118 with the interior component that is positioned furthest from exterior component 206, and/or fluid-permeable region 110 extends along injection shaft 104 such as to provide fluid communication between liquid shim conduit 106 and the plurality of corresponding gaps 220.

With continued reference to FIG. 1, injection shaft 104 may comprise any suitable size and/or shape. In some examples, injection shaft 104 is an elongate member, in which the length of injection shaft 104 is greater than an outermost lateral shaft-dimension 113 of injection shaft 104. As more specific examples, injection shaft 104 is generally cylindrical and/or a polygonal prism, such as a rectangular or other prism. Outermost lateral shaft-dimension 113 is measured transverse, or perpendicular, to the length of injection shaft 104. For example, when injection shaft 104 comprises a cylindrical shape, outermost lateral shaft-dimension 113 of injection shaft 104 is the diameter of injection shaft 104. In some examples, outermost lateral shaft-dimension 113 is configured to closely correspond to and/or match the geometry of bore 204. In particular, in some examples outermost lateral shaft-dimension 113 is dimensioned to closely fit within bore 204. As more specific examples, outermost lateral shaft-dimension 113 is a threshold fraction of a corresponding inside dimension, such as an inside diameter, of bore 204, with examples of the threshold fraction including at least 70%, at least 80%, at least 90%, at least 95%, at least 98%, at least 99%, at most 95%, at most 99%, and/or less than 100%.

In some examples, outermost lateral seal-dimension 123 of actuated fluid seal 116 is greater than outermost lateral shaft-dimension 113 when actuated fluid seal 116 is in sealing conformation 122. In this way, when injection shaft 104 is positioned operably within bore 204, and actuated fluid seal 116 is in sealing conformation 122, actuated fluid seal 116 extends laterally beyond injection shaft 104 to form fluid seal 118 with interior component 205. Additionally or alternatively, in some examples, outermost lateral seal-dimension 123 of actuated fluid seal 116 is equal to, at least substantially equal to, and/or less than outermost lateral shaft-dimension 113 of injection shaft 104 when actuated fluid seal 116 is in translation conformation 124. In this way, injection shaft 104 may be translated within bore 204 when actuated fluid seal 116 is in translation conformation 124.

Actuated fluid seal 116 includes any suitable structure and/or combination of one or more materials that are configured to be transitioned among the plurality of conformations. As examples, actuated fluid seal 116 comprises one or more of a resilient body 160, a bladder, a resilient bladder, an elastomeric body, a fluid-resistant body, a smooth body, a non-porous body, and/or a flexible body. Examples of suitable materials that optionally are included in actuated fluid seal 116 include one or more of a plastic, a polymer, a polymeric material, a fluid-resistant material, a non-stick material, a chemically resistant material, a rubber, a synthetic rubber, a silicone, mylar, latex, nylon, polytetrafluoroethylene (PTFE), and/or neoprene. Actuated fluid seal 116 also may include any suitable shape, such as a tubular shape, a cylinder, a sphere, a spheroid, a polygonal prism, and/or combinations thereof. In some examples, the shape of actuated fluid seal 116, or a lateral cross-section thereof, is configured to match an internal shape of bore 204 in interior component 205.

Actuated fluid seal 116 also may be configured to be actuated and/or selectively transitioned among the plurality of conformations in any suitable manner. As examples, actuated fluid seal 116 is one or more of mechanically actuated, fluidly actuated, pneumatically actuated, hydraulically actuated, electrically actuated, magnetically actuated, and electro-magnetically actuated. Likewise, fluid seal actuator assembly 130 may actuate actuated fluid seal 116 via any suitable mechanism, such as one or more of mechanical actuation, fluid actuation, pneumatic actuation, hydraulic actuation, and/or electrical actuation. As more examples, actuated fluid seal 116 is configured to be transitioned among the plurality of conformations via one or more of deformation, compression, expansion, contraction, elongation, widening, narrowing, inflation and/or deflation. With this in mind, in some examples, fluid seal actuator assembly 130 is configured to deform, compress, expand, elongate, widen, narrow, inflate, and/or deflate actuated fluid seal 116 to selectively and operably transition actuated fluid seal 116 among the plurality of conformations and/or to selectively and operably change outermost lateral seal-dimension 123 of actuated fluid seal 116.

As a more specific example, when actuated fluid seal 116 includes resilient body 160, fluid seal actuator assembly 130 is configured to selectively deform resilient body 160 to selectively and operably transition actuated fluid seal 116 among the plurality of conformations. In particular, in some such examples, resilient body 160 defines outermost lateral seal-dimension 123, and resilient body 160 is configured to be selectively deformed to change the outermost lateral seal-dimension 123 of actuated fluid seal 116. Stated differently, in some examples, fluid seal actuator assembly 130 is configured to selectively deform resilient body 160 to selectively change outermost lateral seal-dimension 123 of actuated fluid seal 116.

In some examples, fluid seal actuator assembly 130 is configured to compress, or apply a compressive force to, actuated fluid seal 116 and/or resilient body 160 to transition actuated fluid seal 116 from translation conformation 124 to sealing conformation 122 and/or to increase outermost lateral seal-dimension 123. Additionally or alternatively, in some examples, fluid seal actuator assembly 130 is configured to elongate, or apply an elongating force to, actuated fluid seal 116 and/or resilient body 160 to transition actuated fluid seal 116 from sealing conformation 122 to translation conformation 124 and/or to decrease the outermost lateral seal-dimension 123. As another example, when actuated fluid seal 116 comprises a bladder and/or a resilient bladder, fluid seal actuator assembly 130 is configured to transition actuated fluid seal 116 from translation conformation 124 to sealing conformation 122 and/or increase outermost lateral seal-dimension 123 by flowing fluid, such as a gas or a liquid, into the bladder to expand the bladder, and is configured to transition actuated fluid seal 116 from sealing conformation 122 to translation conformation 124 and/or to decrease the outermost lateral seal-dimension 123 by flowing fluid from the bladder to contract or deflate the bladder.

Actuated fluid seal 116 may be configured to operably contact and/or form fluid seal 118 with any suitable portion, region, and/or surface of interior component 205 when injection shaft 104 is positioned operably within bore 204 and/or when actuated fluid seal 116 is in sealing conformation 122. As examples, actuated fluid seal 116 operably contacts and/or forms fluid seal 118 with interior-facing surface 234 of interior component 205, a portion of bore 204 that extends within interior component 205, and/or an interior component gap-facing surface 236 of interior component 205 that faces gap 220.

With continued reference to FIG. 1, fluid seal actuator assembly 130 may include any suitable type of actuator assembly and may actuate actuated fluid seal 116 in any suitable manner. As examples, fluid seal actuator assembly 130 includes a mechanical actuator assembly, a fluid actuator assembly, a pneumatic actuator assembly, a hydraulic actuator assembly, and/or an electrical actuator assembly. As more specific examples, pneumatic actuator assemblies and/or hydraulic actuator assemblies includes one or more pumps or pistons for flowing fluid to within and/or from within actuated fluid seal 116. As another example, electrical actuator assemblies include one or more solenoid assemblies that apply an actuating force to actuated fluid seal 116 responsive to receiving electrical power.

As shown in FIG. 1, liquid shim injection device 100 may be described as having a proximal end region 154 and an opposed distal end region 156. In some examples, at least a portion of fluid seal actuator assembly 130 or actuated fluid seal 116 defines or is positioned within distal end region 156. In some examples, fluid seal actuator assembly 130 is configured to permit actuation of actuated fluid seal 116 from proximal end region 154. More specifically, in some examples, fluid seal actuator assembly 130 comprises an actuator connecting member 134 that extends along injection shaft 104 from proximal end region 154 to actuated fluid seal 116 and is configured to transmit actuation stimulus from proximal end region 154 to actuated fluid seal 116.

The actuation stimulus transmitted by actuator connecting member 134 includes any suitable stimulus, force, or power to facilitate actuation of actuated fluid seal 116, with examples including electrical stimulus, mechanical stimulus, and/or fluid stimulus. As examples, actuator connecting member 134 includes at least one of a fluid conduit, an electrical power conduit, and a mechanical connection. As discussed in more detail herein, an example of a mechanical connection is an actuation rod 136 that is configured to transmit mechanical force and/or mechanical stimulus from proximal end region 154 to actuated fluid seal 116. As a more specific example, when fluid seal actuator assembly 130 includes one or more solenoid actuators, actuator connecting member 134 includes an electrical conduit that is configured to supply electrical power to the one or more solenoid actuators to actuate actuated fluid seal 116, such as discussed herein. When fluid seal actuator assembly 130 comprises a pneumatic actuator assembly or a hydraulic actuator assembly, in some examples, actuator connecting member 134 includes a fluid conduit that is configured to supply fluid to actuate actuated fluid seal 116, such as discussed herein.

As shown in FIG. 1, in some examples, proximal end region 154 is positioned within exterior region 222 when injection shaft 104 is positioned operably within bore 204. In such examples, fluid seal actuator assembly 130 and/or actuator connecting member 134 permits actuation of actuated fluid seal 116 from exterior region 222.

In some examples, fluid seal actuator assembly 130 comprises an actuator retention mechanism 180 that is configured to selectively and operably retain actuated fluid seal 116 in a desired conformation, such as sealing conformation 122 and/or translation conformation 124. For example, when fluid seal actuator assembly 130 includes actuation rod 136, in some examples, actuator retention mechanism 180 are configured to selectively engage with actuation rod 136 to selectively and operably secure actuation rod 136 at a desired position relative to body 102, injection shaft 104, and/or actuated fluid seal 116. As examples, actuator retention mechanism 180 include one or more of a ratchet, a threaded bore that mates with threads on actuation rod 136, a pin, a hole, a hitch, a clip, a latch, a twist-lock, a bolt, a nut, and/or combinations thereof.

With continued reference to FIG. 1, when included, fluid barrier 114 includes any suitable structure forming a flow barrier. Examples of suitable fluid barrier 114 structures include a gasket, an o-ring, and/or a stopper. Fluid barrier 114 also may be constructed from any suitable one or more materials, such as any of the one or more same materials that are utilized to form actuated fluid seal 116, or one or more different materials such as a ceramic, graphite, or asbestos.

Fluid barrier 114 may be disposed along any suitable location or region of body 102. In some examples, fluid barrier 114 is operably coupled to a proximal region of injection shaft 104 and/or extends circumferentially about the perimeter of injection shaft 104. In this configuration, fluid barrier 114 possesses an outermost lateral barrier-dimension 120 that is greater than outermost lateral shaft-dimension 113. When injection shaft 104 is positioned operably within bore 204, fluid barrier 114 covers and/or at least partially fills, or plugs at least a portion of bore 204 within exterior component 206 and form flow barrier 117 therewith. That said, fluid barrier 114 may be configured to operably contact and form flow barrier 117 with any suitable portion or region of exterior component 206, such as exterior-facing surface 230 of exterior component 206 that faces exterior region 222, within bore 204 of exterior component 206, and/or an exterior component gap-facing surface 232 of exterior component 206 that faces gap 220.

As shown in FIG. 1, in some examples, body 102 includes a circumferential ledge 150 positioned proximate injection shaft 104 and within proximal portion 140 of liquid shim injection devices 100 and fluid barrier 114 is positioned along, or operably coupled along, an underside of, or a distal surface of, circumferential ledge 150. In such examples, circumferential ledge 150 additionally or alternatively may be referred to as circumferential flange 150 and/or circumferential collar 150 and includes an outermost lateral ledge-dimension 158 that is greater than outermost lateral shaft-dimension 113. Circumferential ledge 150 may include any suitable shape, such as circular shapes, or non-circular shapes. In particular, when fluid barrier 114 is positioned along the underside of circumferential ledge 150, in some examples, fluid barrier 114 includes a gasket and/or an o-ring that covers at least a portion of, or the entirety of, the underside surface of circumferential ledge 150, such that fluid barrier 114 extends circumferentially about a proximal end portion of injection shaft 104. In some such examples, fluid barrier 114 is configured to form flow barrier 117 with exterior-facing surface 230 of exterior component 206 in which flow barrier 117 surrounds the exterior rim or opening of bore 204.

In some examples, circumferential ledge 150 additionally or alternatively is configured to form a stop collar that engages with exterior component 206 when injection shaft 104 is inserted into bore 204 such as to position injection shaft 104 with a desired depth or extension within bore 204, to operably position fluid-permeable region 110 at a desired position within bore, such as proximate or at least partially within gap 220, and/or to operably position actuated fluid seal 116 at a desired position within bore 204, such as proximate interior component 205. In some examples, the longitudinal position (i.e., position along liquid shim injection device 100 from proximal end region 154 to distal end region 156) of circumferential ledge 150 is configured to be adjusted, such as to control the length of injection shaft 104, the longitudinal separation between actuated fluid seal 116 and circumferential ledge 150 and/or fluid barrier 114, and/or the longitudinal separation between circumferential ledge 150 and fluid-permeable region 110.

With continued reference to FIG. 1, in some examples, actuated fluid seal 116 is a first actuated fluid seal and fluid barrier 114 is or includes a second actuated fluid seal. In other words, fluid barrier 114 may include similar or at least substantially similar features, functions or components to those discussed herein for actuated fluid seal 116, while being positioned within proximal portion 140. More specifically, when fluid barrier 114 is or includes the second actuated fluid seal, fluid barrier 114 is configured to be selectively transitioned among a plurality of conformations that include a sealing conformation and a translation conformation, such as discussed herein. In some such examples, fluid seal actuator assembly 130 is configured to selectively transition fluid barrier 114 among the plurality of conformations and/or includes one or more actuators for actuating fluid barrier 114. Stated differently liquid shim injection devices 100 include a distal actuated fluid seal and a proximal fluid seal that are separated from one another by fluid-permeable region 110 when fluid barrier 114 is or includes an actuated fluid seal 116. For some examples in which fluid barrier 114 is or includes an actuated fluid seal 116, fluid barrier 114 is configured to form a fluid seal with exterior component 206 when fluid barrier 114 is in the sealing conformation.

As mentioned, fluid-permeable region 110 is formed along injection shaft 104 and is configured to provide fluid communication between liquid shim conduit 106 and exterior 112 to injection shaft 104. In some examples, fluid-permeable region 110 forms one or more passageways for liquid shim material 108 to flow from liquid shim conduit 106 to exterior 112 to injection shaft 104 or to a region outside of injection shaft 104. In some examples, fluid-permeable region 110 forms a fluid-permeable annulus about a perimeter of injection shaft 104 through which liquid shim material 108 may be flowed from liquid shim conduit 106 to exterior 112. In some such examples, such as when injection shaft 104 is cylindrical, or comprises a cylindrical shape, fluid-permeable region 110 forms a cylindrical annulus about injection shaft 104.

Fluid-permeable region 110 may include any suitable structure for providing fluid communication between liquid shim conduit 106 and exterior 112. In some examples, injection shaft 104 comprises a tubular sidewall that surrounds, or at least partially encloses, liquid shim conduit 106, and fluid-permeable region 110 includes a plurality of perforations, passageways, tubules, and/or conduits that extend through the tubular sidewall. Additionally or alternatively, in some examples, fluid-permeable region 110 includes a fluid-permeable structure, such as a mesh screen, an expanded metal screen, a porous body, such as a porous metal body or a porous ceramic body, that is operably coupled to, and interposes, proximal portion 140 and distal portion 142 of injection shaft 104.

In some examples, fluid-permeable region 110 is configured to flow, distribute, direct, and/or extrude liquid shim material 108 in a particular manner or direction. As an example, fluid-permeable region 110 is configured to extrude liquid shim material 108 in an outward direction from injection shaft 104, such as a radially outward direction, or in a direction that is generally traverse to, or perpendicular to, the length of injection shaft 104. Additionally or alternatively, in some examples, fluid-permeable region 110 is configured to flow or extrude liquid shim material 108 evenly about, or with respect to, the perimeter of injection shaft 104. As a more specific example, when injection shaft 104 and/or fluid-permeable region 110 are cylindrical, fluid-permeable region is configured to flow or extrude liquid shim material 108 in the outward direction evenly about the circumference of injection shaft 104 and/or the circumference of fluid-permeable region 110. Stated another way, in some examples, fluid-permeable region 110 is configured to extrude or flow liquid shim material 108 from liquid shim conduit 106 to fill an annular region 226 of gap 220 with extruded liquid shim material 109. Additionally or alternatively, in some examples, fluid-permeable region 110 is configured to flow liquid shim material 108 into gap 220 such that extruded liquid shim material 109 contacts exterior component gap-facing surface 232 and/or interior component gap-facing surface 236 of interior component 205.

In some examples, fluid-permeable region 110 is, or includes, an actuated fluid-permeable region 144 that comprises a flowing configuration 146 and a closed configuration 148, in which, actuated fluid-permeable region 144 is configured to provide fluid communication between liquid shim conduit 106 and exterior 112 in flowing configuration 146 and is configured to restrict fluid communication between liquid shim conduit 106 and exterior 112 in closed configuration 148. Stated differently, in some examples, actuated fluid-permeable region 144 is configured to permit the flow or extrusion of liquid shim material 108 from liquid shim conduit 106 to exterior 112 in flowing configuration 146 and is configured to restrict the flow or extrusion of liquid shim material 108 from liquid shim conduit 106 to exterior 112 in closed configuration 148.

For some examples in which fluid-permeable region 110 is, or includes, actuated fluid-permeable region 144, liquid shim injection device 100 further includes a fluid actuator assembly 145 that is configured to selectively and operably transition actuated fluid-permeable region 144 between flowing configuration 146 and closed configuration 148. As examples, fluid actuator assembly 145 may include at least one of one or more flow actuators, one or more actuated valves, and/or an actuated internal sheath that is disposed within liquid shim conduit 106 configured to selectively and operably translate to restrict and provide fluid communication between fluid-permeable region 110 and liquid shim conduit 106. In some examples, fluid actuator assembly 145 includes a fluid actuator connecting member that is configured to permit actuation of actuated fluid-permeable region 144 from proximal end region 154, such as discussed herein for fluid seal actuator assembly 130. As an example, actuated fluid-permeable region 144 may comprise concentric tubular portions with perforations that are aligned when actuated fluid-permeable region 144 is in the flowing configuration 146 and that are misaligned when actuated fluid-permeable region 144 is in the closed configuration 148. That is, one of the concentric tubular portions may be configured to rotate relative to the other one of the concentric tubular portions for selective alignment and misalignment of the perforations.

With continued reference to FIG. 1, in some examples, liquid shim injection devices 100 include a liquid shim delivery system 152 that is in fluid communication with liquid shim conduit 106 and configured to selectively and operably provide liquid shim material 108 to liquid shim conduit 106. More specifically, in some examples, liquid shim delivery system 152 is configured to selectively and operably flow liquid shim material 108 to liquid shim conduit 106 to selectively extrude or flow liquid shim material 108 from fluid-permeable region 110 to exterior 112. Stated differently, when injection shaft 104 is positioned operably within bore 204, in some examples, liquid shim delivery system 152 is configured to selectively and operably flow liquid shim material 108 to liquid shim conduit 106 to selectively extrude or flow liquid shim material 108 from fluid-permeable region 110 to within gap 220 to selectively inject or deposit extruded liquid shim material 109 within gap 220.

In some examples, liquid shim delivery system 152 is configured to selectively flow a predetermined volume of liquid shim material 108 through liquid shim conduit 106 to extrude the predetermined volume of liquid shim material 108 through fluid-permeable region 110. For example, when injection shaft 104 is positioned operably within bore 204, in some examples, liquid shim delivery system 152 is configured to selectively flow a predetermined volume of liquid shim material 108 through liquid shim conduit 106 to selectively deposit or inject a predetermined volume of extruded liquid shim material 109 within gap 220. More specifically, the predetermined volume of extruded liquid shim material 109 may correspond to an annular diameter or volume of annular region 226 surrounding bore 204 that is desired to be filled with liquid shim material 108. As examples, annular diameter of annular region 226 is a threshold fraction of the bore diameter of bore 204, with examples of the threshold fraction including at least 101% at least 105%, at least 110%, at least 120%, at least 150%, at least 200%, at most 150%, at most 200%, at most 300%, and/or at most 400%. Additionally or alternatively, the predetermined volume of extruded liquid shim material 109 may correspond to the height of gap 220 and/or the distance between exterior component 206 and interior component 205 proximate bore 204, examples of which include at least 25 micrometers, at least 50 micrometers, at least 75 micrometers, at least 100 micrometers, at least 200 micrometers, at most 75 micrometers, at most 100 micrometers, at most 100 micrometers, at most 200 micrometers, and/or at most 500 micrometers.

When included, liquid shim delivery system 152 comprises any suitable mechanism, actuator(s), and/or structure for operably providing liquid shim material 108 to liquid shim conduit 106. As examples, liquid shim delivery system 152 may comprise at least one of a pump 162 configured to pump, flow, or move liquid shim material 108, a liquid shim reservoir 164 configured to contain a volume of liquid shim material 108 and optionally gravity-feed liquid shim material 108, a valve system configured to control the flow of liquid shim material 108 to liquid shim conduit 106 and optionally meter the preselected volume of liquid shim material 108, and a liquid shim line 166 that is in fluid communication with an external source 168 of liquid shim material 108.

Liquid shim injection device 100 may be configured to handle, flow, and/or inject any suitable type of liquid shim material 108. Typically, liquid shim material 108 is selected to be compatible with the material of adjacent components 202, such as to prevent, restrict, or otherwise reduce corrosion or other structurally compromising effects and/or to enhance bonding between liquid shim material 108 and adjacent components 202. As more specific examples, liquid shim material 108 may include one or more of a curable liquid shim material, a hardening liquid shim material, a resin, an epoxy, an epoxy resin, a 2-part resin, an adhesive, an adhesive resin, a polymer, a polymeric material, and/or a curable composite material. In particular, in some examples, liquid shim material 108 is configured to be in a liquid or flowable state when liquid shim material 108 is within liquid shim delivery system 152, is within liquid shim conduit 106, passing through fluid-permeable region 110, and or injected into gap 220 as extruded liquid shim material 109, but may be configured to cure, harden, solidify, and/or set into a structural material after being extruded by liquid shim injection device 100. As such, liquid shim material 108 additionally or alternatively may be referred to as structural liquid shim material 108.

In some examples, liquid shim material 108 further is configured to bind to, or adhere to, interior component 205 and/or exterior component 206 once cured, hardened, or set within gap 220. For some examples in which liquid shim material 108 is configured to cure, set, or harden within gap 220, liquid shim injection device 100 includes a curing shaft that is operably coupled to, or defines a portion of, distal end region 156. Optionally, the curing shaft is configured to be decoupled from a remainder of liquid shim injection device 100 and left within bore 204 after extruded liquid shim material 109 has been deposited therein and/or after injection shaft 104 has been removed therefrom. In such examples, the curing shaft is configured to prevent extruded liquid shim material 109 from flowing into bore 204 while extruded liquid shim material 109 hardens, cures, or sets.

With continued reference to FIG. 1, liquid shim injection devices 100 are configured to be operated in any suitable manner. In some examples, liquid shim injection device 100 is configured as a handheld device, is a hand-operated device, and/or is configured to be operated by a human operator, such as trained or authorized personnel. Additionally or alternatively, liquid shim injection device 100 is configured to be mounted to, mounted with, or mounted as an end effector of a robotic arm 170 or other robotic device.

Figure 2:
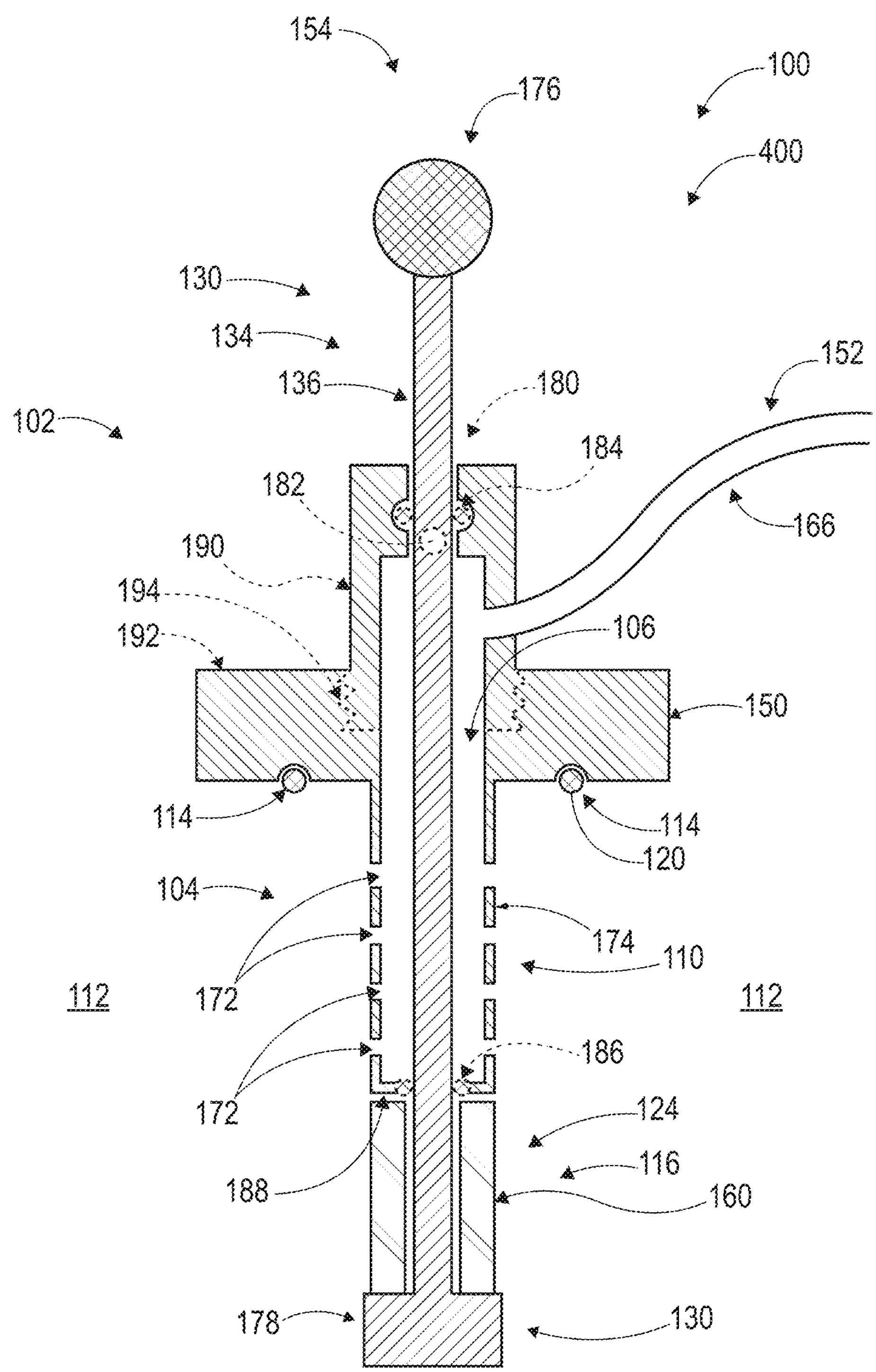
FIG. 2 is a schematic cross-sectional view representing more specific examples of the liquid shim injection devices of FIG. 1.
Figure 3:
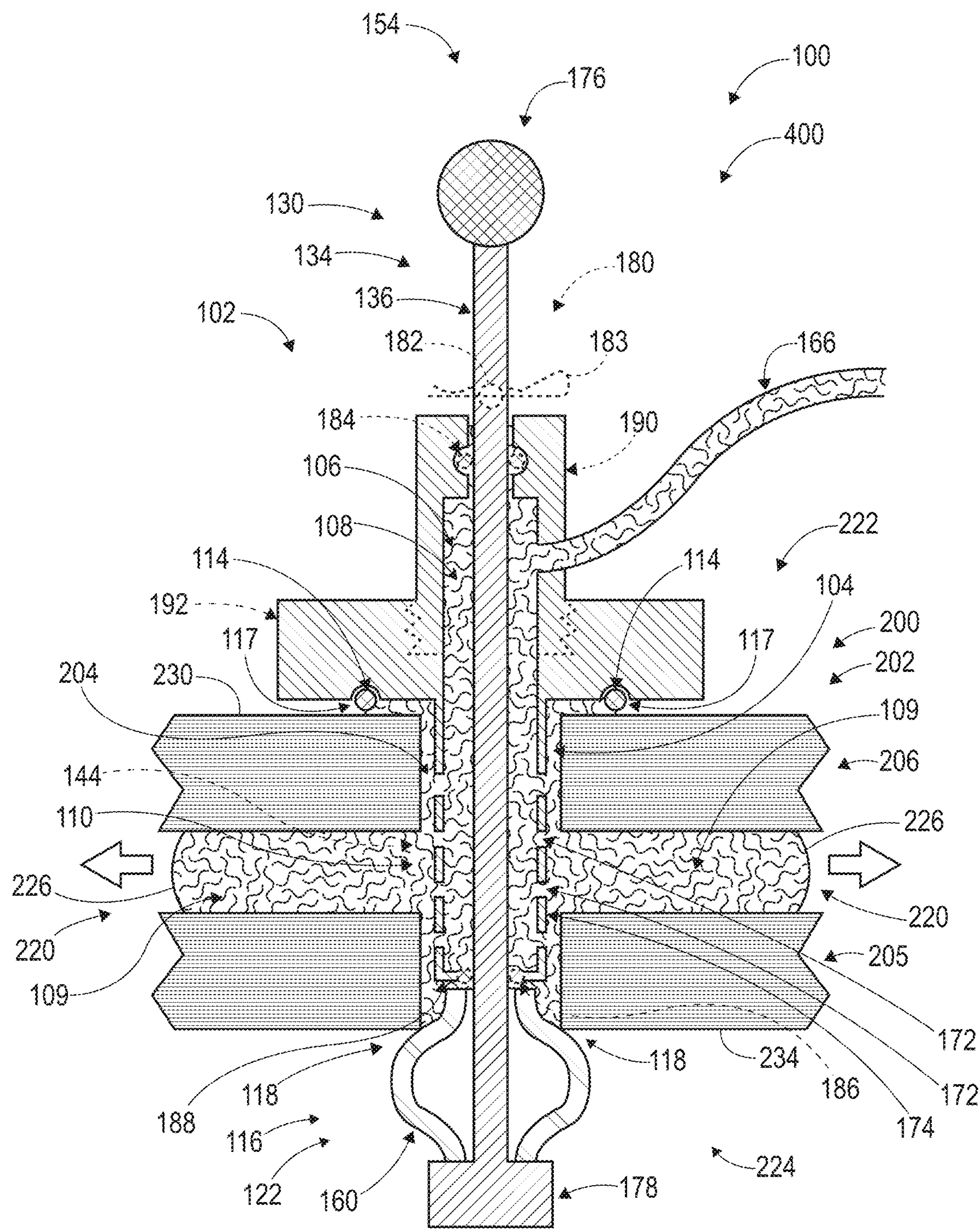
FIG. 3 illustrates the examples of liquid shim injection devices of FIG. 2 flowing liquid shim material into a gap between adjacent components of an assembly.
Figure 4:
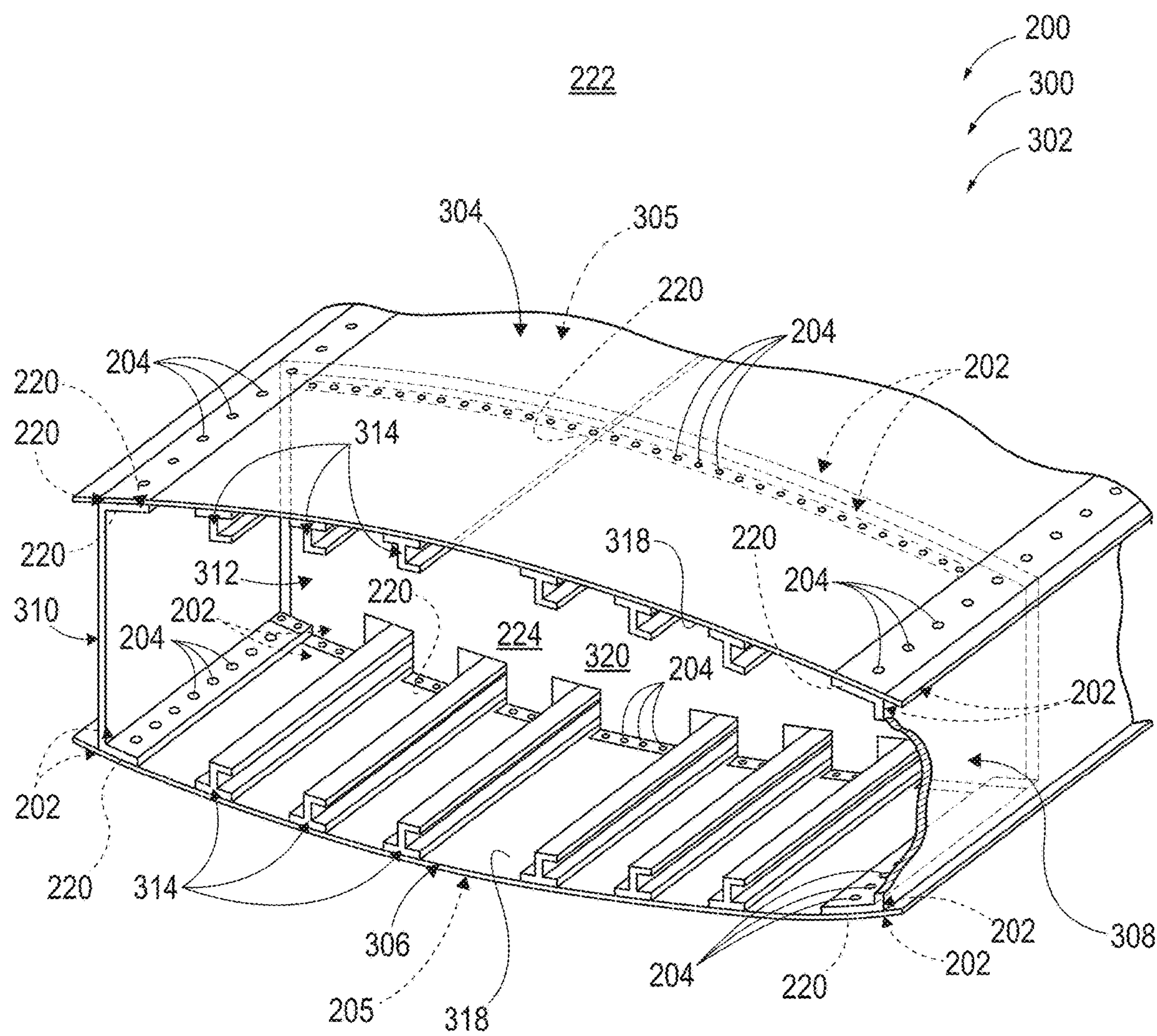
FIG. 4 is an isometric cutaway view of a portion of a wing box of an aircraft where the device shown in FIGS. 1-3 can be used.

Turning now to FIGS. 2-4, illustrative non-exclusive examples of liquid shim injection devices 100 and assemblies 200 are illustrated. Where appropriate, the reference numerals from the schematic illustrations of FIG. 1 are used to designate corresponding parts of FIGS. 2-4; however, the examples of FIGS. 2-4 are non-exclusive and do not limit liquid shim injection devices 100 and assemblies 200 to the illustrated embodiments of FIGS. 2-4. That is, liquid shim injection devices 100 and assemblies 200 are not limited to the specific embodiments and/or specific applications illustrated in FIGS. 2-4, and liquid shim injection devices 100 and assemblies 200 may incorporate any number of the various aspects, configurations, characteristics, properties, etc. of liquid shim injection devices 100 and assemblies 200 that are illustrated in and discussed with reference to the schematic representations of FIG. 1 and/or the embodiments of FIGS. 2-4, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 2-4; however, it is within the scope of the present disclosure that the previously discussed features, variants, etc. may be utilized with the embodiments of FIGS. 2-4.

FIGS. 2 and 3 illustrate, in cross-section, examples of liquid shim injection devices 100, referred to herein as liquid shim injection devices 400. In FIG. 2, liquid shim injection devices 400 are represented with actuated fluid seal 116 in translation conformation 124, and in FIG. 3, liquid shim injection devices 400 are represented with actuated fluid seal 116 in sealing conformation 122 and extending through bore 204 of assembly 200. As shown, liquid shim injection devices 400 include body 102, which includes injection shaft 104 and liquid shim conduit 106, in which liquid shim conduit 106 is defined within body 102 and at least a portion of injection shaft 104. Body 102 also includes fluid-permeable region 110 formed along injection shaft 104 that is configured to provide fluid communication between liquid shim conduit 106 and exterior 112 to injection shaft 104. In the specific example of FIGS. 2 and 3, fluid-permeable region 110 comprises a plurality of perforations 172 that extend laterally through an injection shaft sidewall 174 of injection shaft 104, in which perforations 172 may be distributed evenly about the perimeter of injection shaft 104. Liquid shim injection devices 400 further include actuated fluid seal 116 operably coupled to injection shaft 104. More specifically, actuated fluid seal 116 is illustrated in translation conformation 124 and includes resilient body 160 that is formed in a tubular shape and operably coupled to an injection shaft distal end 188 of injection shaft 104.

Liquid shim injection devices 400 further include fluid seal actuator assembly 130 associated with actuated fluid seal 116 and configured to operably transition actuated fluid seal 116 among the plurality of conformations. More specifically, in these examples, fluid seal actuator assembly 130 is a mechanical actuator assembly. Fluid seal actuator assembly 130 includes actuator connecting member 134 that extends from proximal end region 154 to actuated fluid seal 116 and along injection shaft 104. In particular, actuator connecting member 134 comprises actuation rod 136 that extends through injection shaft 104 and is operably coupled to actuated fluid seal 116. Actuation rod 136 is configured to be selectively translated longitudinally within injection shaft 104 and relative to actuated fluid seal 116 to transition actuated fluid seal 116 among the plurality of conformations. More specifically, actuation rod 136 extends through the inside of resilient body 160 and is operably coupled to, or terminates as, a fluid seal seat 178, or fluid seal flange, that supports the distal end of actuated fluid seal 116 and defines distal end region 156 of liquid shim injection device 400. The other end of actuation rod 136, or an actuation rod proximal end region 176, defines proximal end region 154 of liquid shim injection devices 400.

Actuation rod proximal end region 176 is selectively translated relative to body 102 to selectively translate actuation rod 136 longitudinally within injection shaft 104 and/or relative to actuated fluid seal 116. When actuation rod proximal end region 176 is translated away from actuated fluid seal 116, fluid seal seat 178 compresses actuated fluid seal 116 and/or resilient body 160 against injection shaft distal end 188 to cause resilient body 160 and/or actuated fluid seal 116 to deform outwardly, and/or to cause the outermost lateral seal-dimension of actuated fluid seal 116 to increase. Stated differently, when actuation rod proximal end region 176 is translated away from actuated fluid seal 116, actuated fluid seal 116 transitions towards sealing conformation 122. When actuation rod proximal end region 176 is translated towards actuated fluid seal 116, fluid seal seat 178 may apply a smaller compressive force, or apply an elongating force, to actuated fluid seal 116 to cause actuated fluid seal 116 and/or resilient body 160 to deform inwardly, relax from outward deformation, and/or to cause the outermost lateral seal-dimension to decrease. In other words, when actuation rod proximal end region 176 is translated towards actuated fluid seal 116, actuated fluid seal 116 transitions towards translation conformation 124.

In some examples, actuated fluid seal 116 is formed, biased, and/or resting in sealing conformation 122. In such examples, actuated fluid seal 116 is formed such that actuated fluid seal 116 is in sealing conformation 122, or the outermost lateral seal-dimension 123 of actuated fluid seal 116 is largest, when actuation rod 136 does not apply an actuation force to actuated fluid seal 116, and is configured to transition from its resting, sealing conformation 122 to translation conformation 124 when actuation rod 136 applies an elongating force to actuated fluid seal 116. Stated differently, actuated fluid seal 116 and/or resilient body 160 applies a restoring force to fluid seal seat 178 and/or actuation rod 136 in translation conformation 124 when actuated fluid seal 116 is formed, biased, or resting in sealing conformation 122.

In other examples, actuated fluid seal 116 is formed, biased, and/or resting in translation conformation 124. In such examples, actuated fluid seal 116 is formed such that actuated fluid seal 116 is in translation conformation 124 when actuation rod 136 does not apply an actuation force to actuated fluid seal 116, and transitions to sealing conformation 122 when actuation rod 136 compresses or applies a compressive force to actuated fluid seal 116. Stated differently, actuated fluid seal 116 and/or resilient body 160 applies a restoring force to fluid seal seat 178 and/or actuation rod 136 in sealing conformation 122 when actuated fluid seal 116 is formed, biased, or resting in translation conformation 124.

In some examples of liquid shim injection devices 400, fluid seal actuator assembly 130 comprises actuator retention mechanism 180 that is configured to selectively and operably retain actuated fluid seal 116 in a desired conformation, such as sealing conformation 122 and/or translation conformation 124. More specifically, in the examples of FIGS. 2 and 3, actuator retention mechanism 180 is configured to selectively engage with actuation rod 136 to selectively and operably secure actuation rod 136 at a desired position relative to body 102, injection shaft 104, and/or actuated fluid seal 116. In the specific illustrated examples of liquid shim injection devices 400 in FIG. 2, actuated fluid seal 116 and/or resilient body 160 are resting in translation conformation 124 and/or not applying a restoring force to actuation rod 136. In some examples, actuator retention mechanism 180 comprises a retention bore 182 that is formed along actuation rod 136 and positioned within body 102 when actuated fluid seal 116 is in translation conformation 124. In such examples, and as illustrated in FIG. 3, retention bore 182 is exposed when actuation rod proximal end region 176 is translated away from actuated fluid seal 116, and actuation retention mechanism 180 includes a retention member 183, such as a pin, that is engaged with retention bore 182 to retain retention bore 182 outside of body 102 and/or to retain actuated fluid seal 116 in sealing conformation 122.

In some examples, actuation rod 136 extends within liquid shim conduit 106. In some such examples, liquid shim injection device 400 comprises a proximal rod seal 184 that is operably coupled to body 102 proximate a proximal end of liquid shim conduit 106. When included, proximal rod seal 184 is configured to form at least a partial fluid seal with actuation rod 136 to prevent liquid shim material 108 from exiting liquid shim conduit 106 through the bore in body 102 through which actuation rod 136 extends. Proximal rod seal 184 also is configured to permit actuation rod 136 to translate relative to proximal rod seal 184. Additionally or alternatively, liquid shim injection device 400 comprises a distal rod seal 186 that is operably coupled to injection shaft 104 proximate the distal end of liquid shim conduit 106 and configured to form at least a partial fluid seal with actuation rod 136 to prevent liquid shim material 108 from flowing from the distal end of liquid shim conduit 106. When included, distal rod seal 186 also is configured to permit actuation rod 136 to translate relative to distal rod seal 186. In other examples, actuation rod 136 extends within a conduit that extends through liquid shim conduit 106 and fluidly isolates liquid shim conduit 106 from actuation rod 136, while permitting actuation rod 136 to selectively translate relative to body 102.

Liquid shim injection devices 400 also include fluid barrier 114 and circumferential ledge 150, which forms a portion of body 102. As shown, fluid barrier 114 is disposed along an underside of circumferential ledge 150. The outermost lateral ledge-dimension 158 of circumferential ledge 150 and the outermost lateral barrier-dimension 120 of fluid barrier 114 are greater than the outermost lateral shaft-dimension 113 of injection shaft 104. Liquid shim injection devices 400 further include liquid shim delivery system 152 that is in fluid communication with liquid shim conduit 106. In the examples shown in FIGS. 2 and 3, liquid shim delivery system 152 comprises liquid shim line 166 that is fluid communication with an external source of liquid shim material 108.

In some examples, liquid shim injection devices 400 comprise one or more interconnecting segments that are configured to be selectively and repeatedly interconnected with, and disconnected from, one another to selectively adjust operation of liquid shim injection devices 400 without damage or destruction to liquid shim injection devices 400 and/or one or more components thereof. As shown optionally and schematically in FIGS. 2 and 3, body 102 comprises a head segment 190 and a barrel segment 192 that are operably coupled to one another via coupling interface 194. Head segment 190 encloses a first portion of liquid shim conduit 106 and is interconnected with liquid shim line 166, and actuation rod proximal end region 176 extends from the proximal end of head segment 190. Barrel segment 192 encloses a second portion of liquid shim conduit 106 and comprises injection shaft 104 and circumferential ledge 150. Coupling interface 194 interconnects head segment 190 and barrel segment 192 and is configured to permit head segment 190 and barrel segment 192 to be selectively and repeatedly interconnected with and disconnected from one another. In a specific example, coupling interface 194 comprises mating threaded portions disposed on head segment 190 and barrel segment 192.

In some examples, liquid shim injection devices 400 comprise a plurality of interchangeable barrel segments 192 that are interchanged to adjust various features of body 102, such that liquid shim injection device 400 may be utilized to inject liquid shim material 108 into assemblies 200 having gaps 220, bores 204, and/or adjacent components 202 of various sizes, shapes, and/or dimensions. As an example, each barrel segment 192 includes an injection shaft 104 having a particular length, a particular outermost lateral shaft dimension, and/or a particular position or area of fluid-permeable region 110 along injection shaft 104, such that each barrel segment 192 is utilized to inject liquid shim material 108 between adjacent components 202 of a particular dimension.

With reference to FIG. 3, bore 204 extends through adjacent components 202 from exterior region 222 to interior region 224, and injection shaft 104 is positioned operably within bore 204. In particular, injection shaft 104 is positioned operably within bore 204 such that actuated fluid seal 116 is positioned proximate interior component 205 and fluid barrier 114 operably contacts and forms flow barrier 117 with exterior-facing surface 230 of exterior component 206. Proximal end region 154 of liquid shim injection device 400 is within exterior region 222 defined by assembly 200 and fluid barrier 114 contacts exterior component 206 optionally acting as a stop collar that operably positions injection shaft 104 and/or actuated fluid seal 116 at a desired depth or extension within bore 204.

In FIG. 3, actuated fluid seal 116 is transitioned from translation conformation 124 shown in FIG. 2 to sealing conformation 122, in which the outermost lateral seal-dimension 123 of actuated fluid seal 116 is expanded, such that fluid seal 118 operably contacts, and forms fluid seal 118 with interior component 205. In FIG. 3, actuation rod proximal end region 176 of actuation rod 136 has been translated away from actuated fluid seal 116 and/or injection shaft 104 causing fluid seal seat 178 to compress actuated fluid seal 116 against injection shaft distal end 188, which causes actuated fluid seal 116 and/or resilient body 160 to deform outwardly and increase the outermost lateral seal-dimension 123.

With continued reference to FIG. 3, at least a portion of fluid-permeable region 110 is positioned within gap 220. Liquid shim line 166 flows liquid shim material 108 from an external source of liquid shim material 108 to liquid shim conduit 106 to cause liquid shim material 108 to flow through fluid-permeable region 110 to within gap 220. In other words, liquid shim injection device 400 deposits, extrudes, or injects extruded liquid shim material 109 to within gap 220. Actuated fluid seal 116 and fluid barrier 114 form a fluid-confining space that directs extruded liquid shim material 109 to be deposited within gap 220. In some examples, liquid shim injection device 400 fills annular region 226 of gap 220 that surrounds bore 204 with extruded liquid shim material 109. In some examples, liquid shim delivery system 152 delivers a predetermined volume of liquid shim material 108 to liquid shim conduit 106 to control the volume and/or annular diameter of annular region 226.

In some examples, a portion of extruded liquid shim material 109 is deposited within bore 204. In some such examples, extruded liquid shim material 109 that is deposited in bore 204 is removed from bore 204 by removing injection shaft 104 from within bore 204 while actuated fluid seal 116 is conformed such that the outermost lateral seal-dimension 123 of actuated fluid seal 116 closely corresponds to a diameter of bore 204. Alternatively, extruded liquid shim material 109 that is deposited in bore 204 is removed by drilling or reaming bore 204 after extruded liquid shim material 109 is solidified, hardened, set, or cured within bore 204, such as discussed in more detail herein.

Turning to FIG. 4, illustrated therein is a more specific example of an assembly 200 where previously discussed liquid shim injection devices 100 of FIGS. 1-3 may be utilized. More specifically, FIG. 4 is an isometric cutaway view of a portion of a wing box 302 of an aircraft 300, and wing box 302 may be or include assembly 200 discussed herein with reference to FIGS. 1-3. As shown, wing box 302 is a three-dimensional structure surrounding and at least partially enclosing an interior space 320, which may be, or include interior region 224 of assembly 200. Wing box 302 may be comprised of a plurality of components including an upper wing panel 304, a lower wing panel 306, wing spars 308, 310, one or more ribs 312, and a plurality of stringers 314. In particular, wing spars 308, 310 extend between upper wing panel 304 and lower wing panel 306 and longitudinally along the length of wing box 302. Stringers 314 run generally parallel to wing spars 308, 310 along an interior surface 318 of upper wing panel 304 and an interior surface 318 of lower wing panel 306. While only one rib 312 is visible in FIG. 4, wing boxes 302 generally include a plurality of ribs 312 that may be spaced apart along the length of wing box 302.

A plurality of fasteners are utilized to secure upper wing panel 304 and lower wing panel 306 to wing spars 308, 310 and/or to ribs 312. More specifically, wing box 302 include a plurality of bores 204 extending between upper wing panel 304 and wing spars 308, 310 and/or ribs 312 and/or between lower wing panel 306 and wing spars 308, 310 and/or ribs 312, in which bores 204 may receive the fasteners. Further shown, interior surface 318 of upper wing panel 304 and/or interior surface 318 of lower wing panel 306 are separated from wing spars 308, 310 and/or ribs 312 by gap 220. As discussed herein, in some examples, it is desirable to fill gap 220 with liquid shim material 108. It particularly may be desirable to fill gap 220 when one or more components of wing box 302 are formed from composite and/or non-metallic materials. Thus, liquid shim injection devices 100 according to the present disclosure may be utilized to inject liquid shim material 108 into any of the gaps 220 of wing box 302 that are shown in FIG. 4. In a specific example, liquid shim injection devices 100 discussed herein with reference to FIGS. 1-3 are configured to form fluid seal 118 with at least one of rib 312 and wing spars 308, 310, optionally form fluid barrier 114 with at least one of upper wing panel 304 and lower wing panel 306, and inject liquid shim material 108 into gap 220 between upper wing panel 304 and ribs 312, gap 220 between upper wing panel 304 and wing spars 308, 310, gap 220 between lower wing panel 306 and ribs 312, and/or gap 220 between lower wing panel 306 and wing spars 308, 310.

In the above example, upper wing panel 304 and lower wing panel 306 each define an exterior component 206 while any of rib 312, stringers 314 and/or wing spars 308, 310 each define an interior component 205. In other words, upper wing panel 304 and any of rib 312, stringers 314, and/or wing spars 308, 310 may comprise adjacent components 202 discussed herein and/or lower wing panel 306 and any of rib 312, stringers 314 and/or wing spars 308, 310 may comprise adjacent components 202. Adjacent components 202 at least partially partition exterior region 222 from interior region 224, such that access to ribs 312 and/or stringers 314 and/or interior region 224 from exterior region 222 may be limited. As discussed herein, liquid shim injection devices 100 according to the present disclosure may be configured to inject liquid shim material 108 into gaps 220 of wing box 302 from exterior region 222 and/or without requiring access to interior region 224 and/or interior space 320 of wing box 302.

Figure 5:
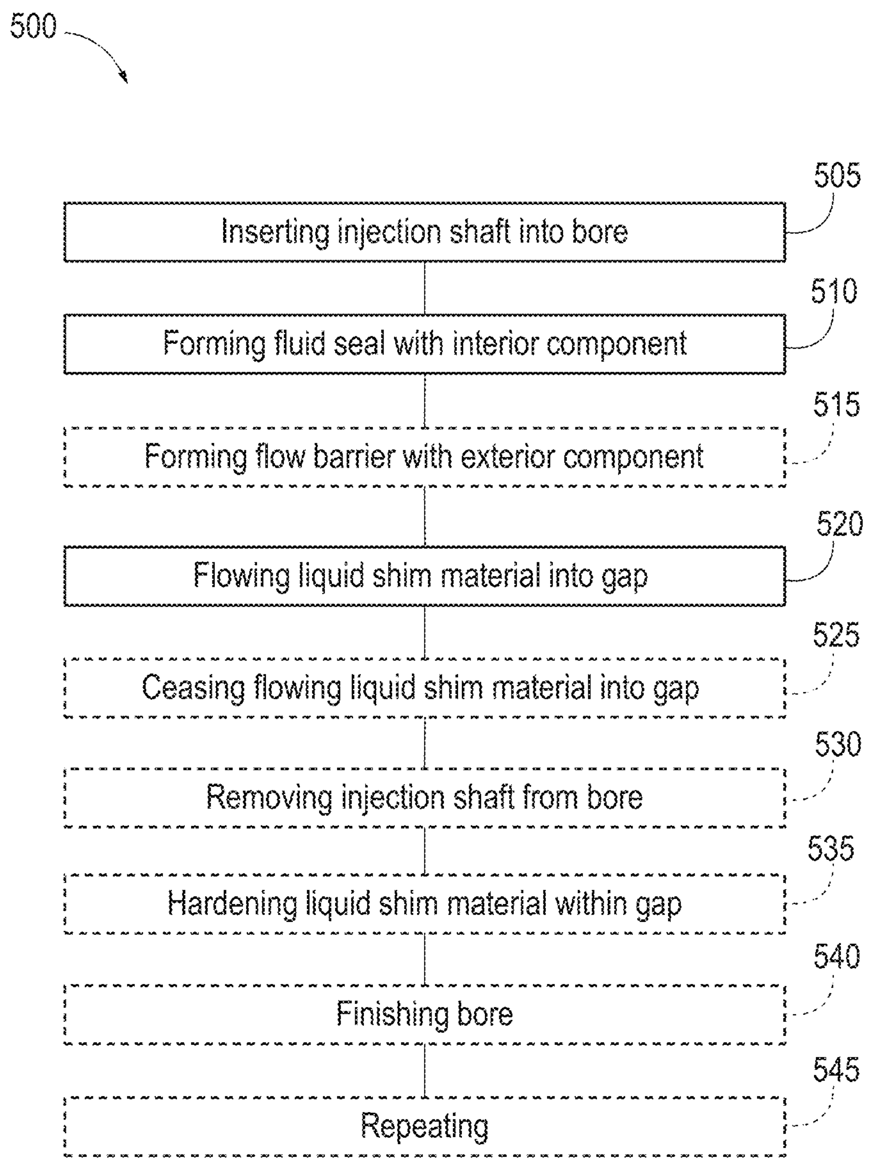
FIG. 5 is a flowchart schematically representing examples of methods of injecting liquid shim material into a gap between adjacent components using the device shown in FIGS. 1-3.

FIG. 5 schematically provides a flowchart that represents illustrative, non-exclusive examples of methods 500 for injecting a liquid shim material into a gap between adjacent components of an assembly according to the present disclosure. In FIG. 5, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 5 are not limiting and other methods and steps are within the scope of the present disclosure, including methods having greater than or fewer than the number of steps illustrated, as understood from the discussions herein. Additionally, methods 500 are not limited to the sequence of steps that are illustrated in FIG. 5, and the steps of methods 500 may be performed in any suitable sequence or order without departing from the scope of the present disclosure.

Methods 500 presented in FIG. 5 may be performed utilizing liquid shim injection device 100 and/or with assemblies 200 that are discussed herein with reference to FIG. 1-4. Stated differently, the liquid shim injection device 100 discussed herein with reference to FIG. 5 and methods 500 may include any of the features, functions, components, attributes, aspects, characteristics, properties, etc. of liquid shim injection device 100 that are discussed herein with reference to FIGS. 1-4, without requiring inclusion of all such features, functions, components, attributes, aspects, characteristics, properties, etc. Similarly, the assemblies 200 with which methods 500 are performed may be assemblies 200 illustrated and discussed herein with reference to FIGS. 1-4 and/or may include may include any of the features, functions, components, attributes, aspects, characteristics, properties, etc. of assemblies 200 that are discussed herein with reference to FIGS. 1-4 without requiring inclusion of all such features, functions, components, attributes, aspects, characteristics, properties, etc. Likewise, liquid shim injection device 100 discussed herein with reference to FIGS. 1-4 may include any the features, functions, components, attributes, aspects, characteristics, properties, etc. of the liquid shim injection device 100 discussed herein with reference to FIG. 5 and methods 500 without requiring inclusion of all such features, functions, components, attributes, aspects, characteristics, properties, etc. and/or may be configured to perform any of the steps and/or functions discussed herein with reference to methods 500 without being required to be configured to perform all such steps and/or functions.

As shown in FIG. 5, methods 500 include inserting 505 an injection shaft 104 of a liquid shim injection device 100 into a bore 204 that extends through adjacent components 202 of an assembly 200, forming a fluid seal 118 between the liquid shim injection device 100 and an interior component 205 of the adjacent components 202 at 510, and flowing 520 the liquid shim material 108 from the liquid shim injection device 100 into the gap 220 that separates the adjacent components 202. Methods 500 optionally include forming 515 a fluid barrier 114 between the liquid shim injection device 100 and an exterior component 206 of the adjacent components 202, ceasing 525 the flowing the liquid shim material 108 into the gap 220, removing 530 the injection shaft 104 from the bore 204, hardening 535 the liquid shim material 108 within the gap 220, finishing 540 the bore 204, and/or repeating 545.

Inserting 505 the injection shaft 104 into the bore 204 additionally or alternatively may be referred to as operably positioning the injection shaft 104 within the bore 204, such as discussed herein. More specifically, in some examples, the inserting 505 the injection shaft 104 into the bore 204 includes positioning an actuated fluid seal 116 of the liquid shim injection device 100 proximate the interior component 205 of the adjacent components 202 and/or positioning at least a portion of a fluid-permeable region 110 of the injection shaft 104 within or proximate the gap 220. As another example, the inserting 505 optionally includes positioning a fluid barrier 114 of the liquid shim injection device 100 proximate and/or in contact with the exterior component 206 of the adjacent components 202. In some examples, the inserting 505 comprises maintaining the actuated fluid seal 116 in a translation conformation 124 during the inserting 505, such as discussed herein.

As discussed herein, in some examples, the assembly 200 and/or the adjacent components 202 defines an exterior region 222 and an interior region 224 that are at least partially separated from one another by the adjacent components 202. In some examples, the inserting 505 comprises inserting the injection shaft 104 into the bore 204 from the exterior region 222 of the adjacent components 202 and/or of the assembly 200.

The inserting 505 is performed with any suitable sequence or timing within methods 500. As examples, the inserting 505 is be performed prior to, or at least substantially simultaneously with, forming 510 the fluid seal 118 and/or forming 515 the flow barrier 117. Additionally or alternatively, the inserting 505 is be performed prior to flowing 520 the liquid shim material 108 into the gap 220, prior to ceasing 525 the flowing, and/or prior to removing 530 the injection shaft 104 from the bore 204.

With continued reference to FIG. 5, methods 500 include forming 510 a fluid seal 118 between the liquid shim injection device 100 and the interior component 205 of the adjacent components 202. The forming 510 the fluid seal 118 additionally or alternatively may be referred to herein as fluidly isolating the interior region 224 of the assembly 200 from the gap 220. The forming 510 the fluid seal 118 comprises forming the fluid seal 118 with the actuated fluid seal 116 of the liquid shim injection device 100. In some examples, the forming 510 the fluid seal 118 comprises transitioning the actuated fluid seal 116 from the translation conformation 124, in which the actuated fluid seal 116 does not form the fluid seal 118 with the interior component 205, to a sealing conformation 122, in which the actuated fluid seal 116 forms the fluid seal 118 with the interior component 205. Additionally or alternatively, the forming 510 the fluid seal 118 comprises increasing an outermost lateral seal-dimension 123 of the actuated fluid seal 116. As a more specific example, the forming 510 the fluid seal 118 comprises compressing the actuated fluid seal 116 along the length of the liquid shim injection device 100 to expand and/or increase the outermost lateral seal-dimension 123 of the actuated fluid seal 116. As discussed herein, the compressing the actuated fluid seal 116 optionally comprises compressing the actuated fluid seal 116 against a distal end of the injection shaft 104.

In some examples, the forming 510 the fluid seal 118 comprises actuating the actuated fluid seal 116 with a fluid seal actuator assembly 130, such as discussed herein. As examples, the forming 510 the fluid seal 118 comprises actuating the actuated fluid seal 116 from the exterior region 222 of the adjacent components 202, opposite the actuated fluid seal 116, and/or from a proximal end region 154 of the liquid shim injection device 100 that may be opposite the actuated fluid seal 116 and/or positioned within the exterior region 222. As more specific examples, the forming 510 the fluid seal 118 comprises transmitting actuation stimulus from the proximal end region 154 of the liquid shim injection device 100 and/or from the exterior region 222 to the actuated fluid seal 116 with an actuator connecting member 134 of the fluid seal actuator assembly 130, such as discussed herein. As yet a more specific example, when the actuator connecting member 134 comprises an actuation rod 136 that is associated with the actuated fluid seal 116 and/or includes a fluid seal seat 178 that supports a distal end of the actuated fluid seal 116, the forming 510 the fluid seal 118 comprises translating a proximal end region of the actuation rod 136 away from the actuated fluid seal 116 and/or away from the interior component 205.

In some examples, the forming 510 the fluid seal 118 comprises securing and/or maintaining the actuated fluid seal 116 in the sealing conformation 122. As a more specific example, when the fluid seal actuator assembly 130 comprises an actuator retention mechanism 180, the forming the fluid seal 118 at 510 comprises engaging the actuator retention mechanism 180 to secure or maintain the actuated fluid seal 116 in the sealing conformation 122, such as discussed herein.

The forming 510 the fluid seal 118 comprises forming the fluid seal 118 between the liquid shim injection device 100 and any suitable portion of the interior component 205, with examples including an interior-facing surface 234 of the interior component 205, an interior component gap-facing surface 236, within the bore 204 in the interior component 205, and/or combinations thereof.

The forming 510 the fluid seal 118 is performed with any suitable sequence or timing within methods 500, such as subsequent to, or substantially simultaneously with, the inserting 505, prior to, substantially simultaneously with, and/or subsequent to forming 515 the fluid barrier 114, and/or prior to flowing 520 the liquid shim material 108. As a more specific example, when the inserting 505 comprises positioning the actuated fluid seal 116 proximate and/or within the bore 204 in the interior component 205, and methods 500 subsequently comprise transitioning actuated fluid seal 116 to the sealing conformation 122 to form fluid seal 118 with the interior component 205 to perform the forming 510 the fluid seal 118. Alternatively, the inserting 505 comprises positioning at least a portion of the actuated fluid seal 116 in the interior region 224, subsequently increasing the outermost dimension of the actuated fluid seal 116 while the actuated fluid seal 116 is within the interior region 224, and subsequently translating the actuated fluid seal 116 towards the interior component 205 to contact and form the fluid seal 118 with an interior-facing surface 234 of the interior component 205. In other words, in some examples, the inserting 505 is performed as a portion of the forming the fluid seal 118 at 510.

With continued reference to the examples of FIG. 5, methods 500 optionally include forming 515 a flow barrier 117 between the liquid shim injection device 100 and the exterior component 206 of the adjacent components 202. The forming 515 the flow barrier 117 additionally or alternatively may be referred to as fluidly isolating the gap 220 between the adjacent components 202 from the exterior region 222. In some examples, the forming 515 comprises forming a flow barrier 117 between a fluid barrier 114 of the liquid shim injection device 100 and the exterior component 206, such as discussed herein. As a more specific example, when the liquid shim injection device 100 comprises a circumferential ledge 150, the fluid barrier 114 is disposed along the underside of the circumferential ledge 150 and the fluid barrier 114 and the circumferential ledge 150 form a stop collar, the forming 515 the flow barrier 117 optionally is performed as a portion of the inserting 505 and comprises positioning the injection shaft 104 and/or actuated fluid seal 116 at a desired position within the bore 204.

The forming 515 the flow barrier 117 comprises forming the flow barrier 117 between the liquid shim injection device 100 and any suitable portion of the exterior component 206, such as an exterior-facing surface 230 of the exterior component 206, an exterior component gap-facing surface 232, the bore 204 within the exterior component 206, and/or combinations thereof. In some examples, the actuated fluid seal 116 is a first actuated fluid seal 116 and the fluid barrier 114 is, or includes, a second actuated fluid seal 116. In some such examples, the forming 515 the flow barrier 117 comprises actuating the second actuated fluid seal 116, such as discussed herein for the forming 510 the fluid seal 118, to form a second fluid seal 118 between the liquid shim injection device 100 and the exterior component 206.

When included, the forming 515 the flow barrier 117 is performed with any suitable sequence or timing within methods 500, such as subsequent to, or substantially simultaneously with, the inserting 505, prior to, substantially simultaneously with, or subsequent to the forming 510 the fluid seal 118, and/or prior to flowing 520 the liquid shim material 108.

As shown in FIG. 5, methods 500 comprise flowing 520 the liquid shim material 108 from the liquid shim injection device 100 into the gap 220 between the adjacent components 202. The flowing 520 additionally or alternatively may be referred to as extruding, depositing, and/or injecting an extruded liquid shim material 109 into the gap 220. In some examples, the flowing 520 comprises flowing liquid shim material 108 from within a liquid shim conduit 106 of the liquid shim injection device 100 through the fluid-permeable region 110 that is formed along the injection shaft 104. Stated differently, the flowing 520 comprises extruding the liquid shim material 108 from the fluid-permeable region 110 of the injection shaft 104. In some such examples, the flowing 520 comprises extruding the liquid shim material 108 in an outward direction from the injection shaft 104, and optionally evenly about, or with respect to, the perimeter and/or circumference of the injection shaft 104. As discussed herein, the liquid shim injection device 100 optionally comprises a liquid shim delivery system 152 that is configured to selectively and operably provide the liquid shim material 108 to the liquid shim conduit 106. In such examples, the flowing 520 comprises flowing, by the liquid shim delivery system 152, the liquid shim material 108 to the liquid shim conduit 106 to flow the liquid shim material 108 from the liquid shim conduit 106 to within the gap 220.

As discussed herein, in some examples, the liquid shim injection device 100 comprises an actuated fluid-permeable region 144 that is configured to be selectively transitioned among a flowing configuration 146 and a closed configuration 148. In such examples, the flowing 520 optionally includes transitioning the actuated fluid-permeable region 144 from the closed configuration 148 to the flowing configuration 146 and/or maintaining the actuated fluid-permeable region 144 in the flowing configuration 146 during the flowing 520.

In some examples, the flowing 520 comprises filling an annular region 226 of the gap 220 that surrounds the bore 204 with liquid shim material 108. In some examples, the annular region 226 comprises an annular diameter and the bore 204 comprises a bore diameter, and the annular diameter is at least a threshold fraction of the bore diameter. Examples of the threshold fraction of the annular diameter to the bore diameter include at least 101%, at least 105%, at least 110%, at least 120%, at least 150%, at least 200%, at most 150%, at most 200%, at most 300%, and/or at most 400%. In some examples, the flowing 520 comprises flowing a predetermined volume of the liquid shim material 108 from the liquid shim conduit 106, in which the predetermined volume is selected on any suitable basis, such as corresponding to a volume of the annular region 226 and/or the annular diameter of the annular region 226, such as discussed herein. In some examples, the flowing 520 comprises flowing, by the liquid shim delivery system 152, a predetermined volume of liquid shim material 108 to within the liquid shim conduit 106, such that a predetermined volume of extruded liquid shim material 109 is deposited within the gap 220.

In some examples, the flowing 520 comprises confining the extruded liquid shim material 109 to within a defined region exterior to the injection shaft 104, in which the confined region may include the gap 220, the annular region 226, and/or at least portion of the bore 204. As an example, the confining the liquid shim material 108 within the defined region includes utilizing the fluid seal 118 and optionally the flow barrier 117 to confine the liquid shim material 108 to within the defined region. More specifically, in some examples, the flowing 520 comprises preventing, by the actuated fluid seal 116, the extruded liquid shim material 109 from flowing to the interior region 224, and optionally a portion of the bore 204 that extends through the interior component 205. When methods 500 include the forming 515 the flow barrier 117, the flowing 520 may include preventing, by the fluid barrier 114, the extruded liquid shim material 109 from flowing to the exterior region 222, and optionally a portion of the bore 204 that extends through the exterior component 206.

The flowing 520 the liquid shim material 108 is performed with any suitable sequence or timing within methods 500. As examples, the flowing 520 is performed subsequent to the inserting 505, subsequent to the forming 510 the fluid seal 118, subsequent to forming 520 the flow barrier 117, prior to ceasing 525 the flowing, prior to removing 530 the injection shaft 104 from the bore 204, and/or prior to hardening 535 the liquid shim material 108.

With continued reference to FIG. 5, methods 500 optionally include ceasing 525 flowing the liquid shim material 108 into the gap 220. As examples, the ceasing 525 comprises ceasing flowing the liquid shim material 108 when the predetermined volume of liquid shim material 108 is deposited in the gap 220, when the annular region 226 surrounding the bore 204 is filled with extruded liquid shim material 109, and/or when the annular diameter is the threshold fraction of the bore diameter. In some examples, the ceasing 525 comprises ceasing, by the liquid shim delivery system 152, the providing or flowing the liquid shim material 108 to the liquid shim conduit 106. Additionally or alternatively, when the liquid shim injection device 100 comprises the actuated fluid-permeable region 144, the ceasing 525 may comprise transitioning the actuated fluid-permeable region 144 from the flowing configuration 146 to the closed configuration 148. When included, the ceasing 525 is performed with any suitable sequence or timing within methods 500, such as subsequent to the flowing 520, prior to the removing 530, and/or prior to the hardening 535.

Methods 500 further may include removing 530 the injection shaft 104 from the bore 204. In some examples, the removing 530 comprises removing the injection shaft 104 from the bore 204 from the exterior region 222. In some examples, the removing 530 includes transitioning the actuated fluid seal 116 from the sealing conformation 122 to the translation conformation 124. When the flowing 520 includes depositing extruded liquid shim material 109 in the bore 204, the removing 530 optionally includes removing at least some of the extruded liquid shim material 109 in the bore 204 from within the bore 204. More specifically, in some examples, the removing 530 includes conforming the actuated fluid seal 116 such that the outermost lateral seal-dimension 123 of the actuated fluid seal 116 closely corresponds to the diameter, or inner circumference, of the bore 204 and translating the actuated fluid seal 116 from within the bore 204, such that the actuated fluid seal 116 urges, pushes, or flows the extruded liquid shim material 109 that is within the bore 204 to the exterior region 222 and/or to within the gap 220.

As discussed herein, in some examples, the liquid shim injection device 100 comprises a curing shaft that may be operably coupled to, or define, a distal end region 156 of liquid shim injection device 100. In such examples, the removing 530 comprises positioning the curing shaft within the bore 204, such that the curing shaft prevents extruded liquid shim material 109 within the gap 220 from flowing within the bore 204, to the exterior region 222, and/or to the interior region 224. In some such examples, the removing 530 further includes decoupling the liquid shim injection device 100 from the curing shaft once the curing shaft is positioned operably within the bore 204.

When included, the removing 530 is performed with any suitable sequence or timing within methods 500, such as subsequent to the flowing 520, subsequent to the ceasing 525, prior to the hardening 535, subsequent to the hardening, and/or prior to the finishing 540.

As shown in FIG. 5, in some examples, methods 500 comprise hardening 535 the extruded liquid shim material 109 within the gap 220. Examples of the hardening 535 the extruded liquid shim material 109 within the gap 220 include curing the extruded liquid shim material 109, setting the extruded liquid shim material 109, and/or solidifying the extruded liquid shim material 109. Stated differently, the hardening 535 the extruded liquid shim material 109 additionally or alternatively may be referred to as converting the extruded liquid shim material 109 within the gap 220 into a structural shim material. In some examples, the hardening 535 comprises setting and/or solidifying the extruded liquid shim material 109 by permitting the extruded liquid shim material 109 to set and/or solidify for a setting time. Examples of the setting time include at least 5 minutes, at least 10 minutes, at least 20 minutes, at least 30 minutes, at most 30 minutes, and/or at most 60 minutes. In some examples, the hardening 535 includes curing the extruded liquid shim material 109 and/or the set or solidified liquid shim material 108, which may include permitting the extruded liquid shim material 109 and/or the set or solidified liquid shim material 108 to cure for a curing time. In some examples, the curing is performed substantially simultaneously with the setting. Examples of the curing time include at least 1 hour, at least 2 hours, at least 4 hours, at least 6 hours, at least 8 hours, at most 4 hours, at most 6 hours, at most 8 hours, at most 12 hours, at most 24 hours, and/or at most 48 hours.

In some examples, the hardening 535 is performed once the injection shaft 104 is removed from the bore 204 at 530. Additionally or alternatively, at least a portion of the hardening 535 is performed while the injection shaft 104 is positioned operably within the bore 204. In specific examples, methods 500 include maintaining the injection shaft 104 positioned operably within the bore 204, maintaining the fluid seal 118 in the sealing conformation 122, and/or maintaining the flow barrier 117 during the setting the extruded liquid shim material 109 and/or during the setting and/or for the duration of the setting time. In some such examples, methods 500 comprise performing the removing 530 subsequent to the setting. Alternatively, in some examples, the hardening 535 comprises performing the setting and/or the curing while the curing shaft is positioned operably within the bore 204, without any additional structure positioned in the bore 204. As yet another example, methods 500 may include inserting a fastener into the bore 204 subsequent to the removing 530 and performing the hardening with the fastener inserted within the bore 204.

When included, the hardening 535 is performed with any suitable sequence or timing within methods 500. As examples, the hardening 535 is performed subsequent to the flowing 520, subsequent to the ceasing 525, and/or prior to, or substantially simultaneously with, finishing 540 the bore 204. As more examples, the hardening 535 is be performed prior to the removing 530, substantially simultaneously with the removing 530, and/or subsequent to the removing 530.

With continued reference to FIG. 5, in some examples, methods 500 comprise finishing 540 the bore 204. As mentioned, in some examples, the flowing 520 comprises depositing the extruded liquid shim material 109 within the bore 204. Additionally or alternatively, a portion of the extruded liquid shim material 109 within the gap 220 flows into the bore 204, such as during the hardening 535. With this in mind, the finishing 540 optionally comprises removing set or solidified liquid shim material 108 from within the bore 204 and/or removing cured liquid shim material 108 from within the bore 204. Stated differently, at least a portion of the finishing 540 the bore 204 may be performed subsequent to the setting and/or subsequent to the curing. In particular, when the finishing 540 comprises removing the set, solidified, or cured liquid shim material 108 from within the bore 204, the finishing 540 may include reaming or drilling the bore 204 to remove the set, solidified, or cured liquid shim material 108 from within the bore 204 and/or may be performed to widen the bore 204 to its original diameter or dimension and/or to widen the bore 204 to a desired diameter or dimension.

When included, the finishing 540 the bore 204 is performed with any suitable sequence or timing within methods 500, with examples including substantially simultaneously with, or subsequent to, the hardening 535, subsequent to the ceasing 525, and/or subsequent to the flowing 520.

As shown in FIG. 5, methods 500 optionally comprise repeating 545. The repeating 545 may be performed subsequent to any other step of methods 500 and/or may include repeating any suitable sequence or combination of steps of methods 500. In some examples, the assembly 200 comprises a plurality of bores 204 that extend through the adjacent components 202, and methods 500 comprise repeating 545 any suitable sequence or combination of steps of methods 500 to inject liquid shim material 108 into the gap 220 surrounding at least a subset of, or each of, the plurality of bores 204. With reference to FIG. 4 for a more specific example, the plurality of bores 204 include the plurality of bores 204 that extend through the upper wing panel 304 and the wing spars 308, 310, or any of the other adjacent components 202 of wing box 302 discussed herein. Additionally or alternatively, in some examples, the assembly 200 comprises a plurality of adjacent components 202 and a plurality of corresponding gaps 220 that extend between the plurality of adjacent components 202, and the repeating 545 comprises repeating any suitable sequence or combination of steps of methods 500 to inject liquid shim material 108 into at least a subset of, or each of, the plurality of gaps 220. With reference to FIG. 4 for a more specific example, the plurality of adjacent components 202 may include upper wing panel 304 and one of the wing spars 308, 310, upper wing panel 304 and rib 312, lower wing panel 306 and one of the wing spars 308, 310, and/or lower wing panel 306 and rib 312.

Illustrative, non-exclusive examples of inventive subject matter according to the present disclosure are described in the following enumerated paragraphs:

A1. A liquid shim injection device (100), comprising:

a body (102), comprising:

an injection shaft (104);

a liquid shim conduit (106) defined within the body (102) and configured to channel a liquid shim material (108) within the injection shaft (104); and a fluid-permeable region (110) formed along the injection shaft (104) and configured to provide fluid communication between the liquid shim conduit (106) and an exterior (112) to the injection shaft (104);

an actuated fluid seal (116) operably coupled to the injection shaft (104) and configured to be selectively conformed among a plurality of conformations that includes a sealing conformation (122) and a translation conformation (124), the actuated fluid seal (116) has an outermost lateral seal-dimension (123) that is greater in the sealing conformation (122) than in the translation conformation (124); and a fluid seal actuator assembly (130) associated with the actuated fluid seal (116) and configured to selectively and operably transition the actuated fluid seal (116) among the plurality of conformations.

A2. The liquid shim injection device (100) of paragraph A1, further comprising a fluid barrier (114) operably coupled to the body (102) and configured to form a flow barrier (117).

A2.1. The liquid shim injection device (100) of paragraph A2, wherein the fluid-permeable region (110) is positioned between the fluid barrier (114) and the actuated fluid seal (116).

A2.2. The liquid shim injection device (100) of any of paragraphs A2-A2.1, wherein the actuated fluid seal (116) is a first actuated fluid seal, and wherein the fluid barrier (114) is a second actuated fluid seal.

A2.3. The liquid shim injection device (100) of any of paragraphs A2-A2.2, wherein the fluid barrier (114) comprises a gasket.

A3. The liquid shim injection device (100) of any of paragraphs A1-A2.3, wherein the liquid shim injection device (100) defines a proximal portion (140) and a distal portion (142) that are separated from one another by the fluid-permeable region (110), and wherein the actuated fluid seal (116) forms a portion of the distal portion (142).

A3.1. The liquid shim injection device (100) of paragraph A3, when depending from paragraph A2, wherein the fluid barrier (114) forms a portion of the proximal portion (140).

A3.2.1 The liquid shim injection device (100) of paragraph A3.1, wherein the body (102) comprises a circumferential ledge (150) positioned proximate the injection shaft (104) and within the proximal portion (140), wherein the fluid barrier (114) is positioned along an underside of the circumferential ledge (150).

A4. The liquid shim injection device (100) of any of paragraphs A2-A3.2.1, wherein the actuated fluid seal (116) and the fluid barrier (114) are configured to confine an extruded liquid shim material (109) that is extruded from the fluid-permeable region (110) to within a defined region exterior to the injection shaft (104).

A5. The liquid shim injection device (100) of any of paragraphs A1-A4, wherein the injection shaft (104) comprises an outermost lateral shaft-dimension (113), wherein the outermost lateral seal-dimension (123) is greater than the outermost lateral shaft-dimension (113) when the actuated fluid seal (116) is in the sealing conformation (122).

A5.1 The liquid shim injection device (100) of paragraph A5, wherein the outermost lateral seal-dimension (123) is equal to or less than the outermost lateral shaft-dimension (113) when the actuated fluid seal (116) is in the translation conformation (124).

A6. The liquid shim injection device (100) of any of paragraphs A1-A5.1, wherein the actuated fluid seal (116) comprises a resilient body (160), and wherein fluid seal actuator assembly (130) is configured to selectively deform the resilient body (160) to selectively and operably transition the actuated fluid seal (116) among the plurality of conformations.

A6.1 The liquid shim injection device (100) of paragraphs A6, when depending from paragraph A5, wherein the resilient body (160) defines the outermost lateral seal-dimension (123), and wherein the resilient body (160) is configured to be selectively deformed to change the outermost lateral seal-dimension (123) of the actuated fluid seal (116).

A7. The liquid shim injection device (100) of any of paragraphs A1-A6.1, wherein the actuated fluid seal (116) is one or more of mechanically actuated, fluidly actuated, pneumatically actuated, hydraulically actuated, and electrically actuated.

A8. The liquid shim injection device (100) of any of paragraphs A1-A7, wherein at least one of a portion of the fluid seal actuator assembly (130) or the actuated fluid seal (116) form a distal end region (156) of the liquid shim injection device (100).

A9. The liquid shim injection device (100) of any of paragraphs A1-A8, wherein the fluid seal actuator assembly (130) comprises one or more of mechanical actuator assembly, a fluid actuator assembly, a pneumatic actuator assembly, a hydraulic actuator assembly, or an electrical actuator assembly.

A10. The liquid shim injection device (100) of any of paragraphs A1-A9, wherein the fluid seal actuator assembly (130) is configured to permit actuation of the actuated fluid seal (116) from a proximal end region (154) of the liquid shim injection device (100).

A10.1. The liquid shim injection device (100) of paragraph A10, wherein the fluid seal actuator assembly (130) comprises an actuator connecting member (134) that extends along the injection shaft (104) from the proximal end region (154) to the actuated fluid seal (116) and is configured to transmit actuation stimulus from the proximal end region (154) to the actuated fluid seal (116).

A10.1.1. The liquid shim injection device (100) of paragraph A10.1, wherein the actuator connecting member (134) comprises at least one of a fluid conduit, an electrical power conduit, or a mechanical connection.

A10.1.2. The liquid shim injection device (100) of any of paragraphs A10.1-A10.1.1, wherein the actuator connecting member (134) comprises an actuation rod (136) operably coupled to the actuated fluid seal (116), extending through the injection shaft (104), and configured to be selectively translated to transition the actuated fluid seal (116) among the plurality of conformations.

A10.1.2.1. The liquid shim injection device (100) of paragraph A10.1.2, wherein when the actuation rod (136) is selectively translated away from the actuated fluid seal (116), the actuated fluid seal (116) transitions toward the sealing conformation (122); and wherein when the actuation rod (136) is selectively translated toward the actuated fluid seal (116), the actuated fluid seal (116) transitions toward the translation conformation (124).

A11. The liquid shim injection device (100) of any of paragraphs A1-A10.1.2.1., wherein the fluid-permeable region (110) forms a cylindrical annulus about the injection shaft (104).

A12. The liquid shim injection device (100) of any of paragraphs A1-A11, wherein the fluid-permeable region (110) is configured to extrude the liquid shim material (108) in an outward direction from the injection shaft (104) towards the exterior (112) to the injection shaft (104).

A13. The liquid shim injection device (100) of any of paragraphs A1-A12, wherein the fluid-permeable region (110) is configured to extrude the liquid shim material (108) evenly about a perimeter the injection shaft (104).

A14. The liquid shim injection device (100) of any of paragraphs A1-A13, wherein the fluid-permeable region (110) is an actuated fluid-permeable region (144) comprising a flowing configuration (146) and a closed configuration (148), wherein the actuated fluid-permeable region (144) is configured to provide fluid communication between the liquid shim conduit (106) and the exterior (112) to the injection shaft (104) in the flowing configuration (146), and wherein the actuated fluid-permeable region (144) is configured to restrict fluid communication between the liquid shim conduit (106) and the exterior (112) to the injection shaft (104) in the closed configuration (148).

A15. The liquid shim injection device (100) of any of paragraphs A1-A14, further comprising a liquid shim delivery system (152) that is in fluid communication with the liquid shim conduit (106) and configured to selectively and operably provide the liquid shim material (108) to the liquid shim conduit (106).

A15.1. The liquid shim injection device (100) of paragraph A15, wherein the liquid shim delivery system (152) is configured to selectively flow the liquid shim material (108) to the liquid shim conduit (106) to selectively extrude the liquid shim material (108) from the fluid-permeable region (110).

A15.2. The liquid shim injection device (100) of any of paragraphs A15-A15.1, wherein the liquid shim delivery system (152) is configured to selectively flow a predetermined volume of the liquid shim material (108) through the liquid shim conduit (106) to extrude the predetermined volume of the liquid shim material (108) through the fluid-permeable region (110).

A15.3. The liquid shim injection device (100) of any of paragraphs A15-A15.2, wherein the liquid shim delivery system (152) comprises at least one of a pump (162) configured to pump the liquid shim material (108), a liquid shim reservoir (164) configured to contain a volume of the liquid shim material (108), and a liquid shim line (166) that is in fluid communication with an external source (168) of liquid shim material (108).

A16. The liquid shim injection device (100) of any of paragraphs A1-A15.3, wherein the liquid shim injection device (100) is configured to be at least one of mounted to, mounted with, or mounted as an end effector of a robotic arm (170) or robotic device.

B1. A liquid shim injection device (100) configured to inject a liquid shim material (108) into a gap (220) between adjacent components (202) of an assembly (200), the liquid shim injection device (100) comprising:

a body (102), comprising:

an injection shaft (104) configured to be inserted within a bore (204) that extends through the adjacent components (202) of the assembly (200);

a liquid shim conduit (106) defined within the body (102) and configured to channel the liquid shim material (108) within the injection shaft (104); and a fluid-permeable region (110) formed along the injection shaft (104) and configured to provide fluid communication between the liquid shim conduit (106) and an exterior (112) of the injection shaft (104), wherein the fluid-permeable region (110) is positioned along the injection shaft (104) such that at least a portion of the fluid-permeable region (110) is positioned within the gap (220) when the injection shaft (104) is positioned operably within the bore (204);

an actuated fluid seal (116) operably coupled to the injection shaft (104) and configured to selectively form a fluid seal (118) with an interior component (205) of the adjacent components (202), wherein the actuated fluid seal (116) has a plurality of conformations that includes a sealing conformation (122) and a translation conformation (124), wherein in the sealing conformation (122) of the actuated fluid seal (116) is configured to form the fluid seal (118) with the interior component (205), and wherein in the translation conformation (124) of the actuated fluid seal (116) is configured to be selectively inserted through the bore (204); and a fluid seal actuator assembly (130) associated with the actuated fluid seal (116) and configured to selectively and operably transition the actuated fluid seal (116) among the plurality of conformations.

B2. The liquid shim injection device (100) of paragraph B1, further comprising a fluid barrier (114) operably coupled to the body (102) and configured to form a flow barrier (117) with an exterior component (206) of the adjacent components (202).

B3. The liquid shim injection device (100) of any of paragraphs B1-B2, further comprising the subject matter of any of paragraphs A1-A16.

C1. A method (500) of injecting a liquid shim material (108) into a gap (220) between adjacent components (202) of an assembly (200), the method (500) comprising:

inserting (505) an injection shaft (104) of a liquid shim injection device (100) into a bore (204) that extends through the adjacent components (202);

forming (510) a fluid seal (118) between the liquid shim injection device (100) and an interior component (205) of the adjacent components (202); and flowing (520) the liquid shim material (108) from the liquid shim injection device (100) into the gap (220).

C2. The method (500) of paragraph C1, wherein the inserting (505) comprises positioning at least a portion of a fluid-permeable region (110) of the injection shaft (104) within the gap (220).

C3. The method (500) of any of paragraphs C1-C2, wherein the inserting (505) comprises inserting the injection shaft (104) into the bore (204) from an exterior region (222) of the adjacent components (202).

C4. The method (500) of any of paragraphs C1-C3, further comprising forming (515) a flow barrier (117) between the liquid shim injection device (100) and an exterior component (206) of the adjacent components (202).

C5. The method (500) of any of paragraphs C1-C4, wherein the forming (510) the fluid seal (118) comprises forming the fluid seal (118) with an actuated fluid seal (116) of the liquid shim injection device (100).

C5.1. The method (500) of paragraph C5, wherein the forming (510) the fluid seal (118) comprises transitioning the actuated fluid seal (116) from a translation conformation (124), in which the actuated fluid seal (116) does not form the fluid seal (118) with the interior component (205), to a sealing conformation (122), in which the actuated fluid seal (116) forms the fluid seal (118) with the interior component (205).

C6. The method (500) of any of paragraphs C1-05.1, wherein the forming (510) the fluid seal (118) comprises increasing an outermost lateral seal-dimension (123) of the actuated fluid seal (116).

C7. The method (500) of any of paragraphs C1-C6, wherein the forming (510) the fluid seal (118) comprises actuating the actuated fluid seal (116) from the exterior region (222) of the adjacent components (202), opposite the actuated fluid seal (116).

C8. The method (500) of any of paragraphs C1-C7, wherein the flowing (520) the liquid shim material (108) comprises filling an annular region (226) of the gap (220) that surrounds the bore (204) with the liquid shim material (108).

C8.1. The method (500) of paragraph C8, wherein the annular region (226) comprises an annular diameter and the bore (204) comprises a bore diameter, wherein the annular diameter is at least a threshold fraction of the bore diameter of the bore (204), wherein the threshold fraction is at least one of at least 101%, at least 105%, at least 110%, at least 120%, at least 150%, at least 200%, at most 150%, at most 200%, at most 300%, and at most 400%.

C9. The method (500) of any of paragraphs C1-C8.1, wherein the flowing (520) the liquid shim material (108)

comprises extruding the liquid shim material (108) from a/the fluid-permeable region (110) of the injection shaft (104).

C10. The method (500) of any of paragraphs C1-C9, further comprising ceasing (525) the flowing the liquid shim material (108).

C11. The method (500) of any of paragraphs C1-C10, further comprising removing (530) the injection shaft (104) from the bore (204).

C11.1. The method (500) of paragraph C11, wherein the removing (530) the injection shaft (104) from the bore (204) comprises positioning a curing shaft of the liquid shim injection device (100) within the bore (204).

C12. The method (500) of any of paragraphs C1-C11.1, further comprising hardening (535) the liquid shim material (108) within the gap (220).

C13. The method (500) of any of paragraphs C1-C12, wherein the assembly (200) comprises a plurality of bores (204) that extend through the adjacent components (202), wherein the method (500) further comprises repeating (545) the method (500) of any of paragraphs C1-C12 to inject the liquid shim material (108) into the gap (220) surrounding at least a subset of, or each of, the plurality of bores (204).

C14. The method (500) of any of paragraphs C1-C13, wherein the assembly (200) comprises a plurality of adjacent components (202) and a corresponding a plurality of gaps (220) that extend between the plurality of adjacent components (202), wherein the method (500) comprises repeating (545) the method (500) of any of paragraphs C1-C13 to inject the liquid shim material (108) into at least a subset of, or each of, the plurality of gaps (220).

C15. The method (500) of any of paragraphs C1-C14, wherein the liquid shim injection device (100) comprises the liquid shim injection device (100) of any of paragraphs A1-83.

D1. The use of the liquid shim injection device (100) of any of paragraphs A1-83 to inject liquid shim material into a gap separating adjacent components of an assembly.

D2. The use of the liquid shim injection device (100) of any of paragraphs A1-83 to perform the methods of any of paragraphs C1-C14.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A liquid shim injection device comprising:

a body comprising:

an injection shaft;

a liquid shim conduit defined within the body and configured to channel a liquid shim material within the injection shaft;

a fluid-permeable region formed along the injection shaft and configured to provide fluid communication between the liquid shim conduit and an exterior to the injection shaft;

an actuated fluid seal operably coupled to the injection shaft and configured to be selectively conformed among a plurality of conformations that includes a sealing conformation and a translation conformation, the actuated fluid seal has an outermost lateral seal-dimension that is greater in the sealing conformation than in the translation conformation; and a fluid seal actuator assembly associated with the actuated fluid seal and configured to selectively and operably transition the actuated fluid seal among the plurality of conformations, the fluid seal actuator assembly comprising an actuator rod and a fluid seal seat mechanically coupled to the actuator rod, wherein the actuated fluid seal is mechanically coupled to the fluid seal seat.

2. The liquid shim injection device of claim 1, further comprising a fluid barrier operably coupled to the body and configured to form a flow barrier.

3. The liquid shim injection device of claim 2, wherein the fluid-permeable region is positioned between the fluid barrier and the actuated fluid seal.

4. The liquid shim injection device of claim 1, wherein the injection shaft comprises an outermost lateral shaft-dimension, wherein the outermost lateral seal-dimension is greater than the outermost lateral shaft-dimension when the actuated fluid seal is in the sealing conformation.

5. The liquid shim injection device of claim 1, wherein the actuated fluid seal comprises a resilient body, and wherein the fluid seal actuator assembly is configured to selectively deform the resilient body to selectively and operably transition the actuated fluid seal among the plurality of conformations.

6. The liquid shim injection device of claim 5, wherein the injection shaft comprises an outermost lateral shaft-dimension, wherein the outermost lateral seal-dimension is greater than the outermost lateral shaft-dimension when the actuated fluid seal is in the sealing conformation, wherein the resilient body defines the outermost lateral seal-dimension, and wherein the resilient body is configured to be selectively deformed to change the outermost lateral seal-dimension of the actuated fluid seal.

7. The liquid shim injection device of claim 1, wherein the fluid seal actuator assembly is configured to permit actuation of the actuated fluid seal from a proximal end region of the liquid shim injection device.

8. The liquid shim injection device of claim 1, wherein the fluid-permeable region forms a cylindrical annulus about the injection shaft.

9. The liquid shim injection device of claim 1, wherein the fluid-permeable region is configured to extrude the liquid shim material in an outward direction from the injection shaft towards the exterior to the injection shaft.

10. The liquid shim injection device of claim 1, further comprising a liquid shim delivery system that is in fluid communication with the liquid shim conduit and configured to selectively and operably provide the liquid shim material to the liquid shim conduit.

11. The liquid shim injection device of claim 10, wherein the liquid shim delivery system is configured to selectively flow the liquid shim material to the liquid shim conduit to selectively extrude the liquid shim material from the fluid-permeable region.

12. The liquid shim injection device of claim 1, wherein the liquid shim injection device is configured to be at least one of mounted to, mounted with, or mounted as an end effector of a robotic arm or robotic device.

13. A liquid shim injection device configured to inject a liquid shim material into a gap between adjacent components of an assembly, the liquid shim injection device comprising:

a body comprising:

an injection shaft configured to be inserted within a bore that extends through the adjacent components of the assembly;

a liquid shim conduit defined within the body and configured to channel the liquid shim material within the injection shaft;

a fluid-permeable region formed along the injection shaft and configured to provide fluid communication between the liquid shim conduit and an exterior of the injection shaft, wherein the fluid-permeable region is positioned along the injection shaft such that at least a portion of the fluid-permeable region is positioned within the gap when the injection shaft is positioned operably within the bore;

an actuated fluid seal operably coupled to the injection shaft and configured to selectively form a fluid seal with an interior component of the adjacent components, wherein the actuated fluid seal has a plurality of conformations that includes a sealing conformation and a translation conformation, wherein in the sealing conformation of the actuated fluid seal is configured to form the fluid seal with the interior component, and wherein in the translation conformation of the actuated fluid seal is configured to be selectively inserted through the bore; and a fluid seal actuator assembly associated with the actuated fluid seal and configured to selectively and operably transition the actuated fluid seal among the plurality of conformations, the fluid seal actuator assembly comprising an actuator rod and a fluid seal seat mechanically coupled to the actuator rod, wherein the actuated fluid seal is mechanically coupled to the fluid seal seat.

14. A liquid shim injection device comprising:

a body comprising:

an injection shaft;

a circumferential ledge mechanically coupled to the injection shaft, the circumferential ledge comprising a fluid barrier;

a liquid shim conduit defined within the body and configured to channel a liquid shim material within the injection shaft;

a fluid-permeable region formed along the injection shaft and configured to provide fluid communication between the liquid shim conduit and an exterior to the injection shaft;

an actuated fluid seal operably coupled to the injection shaft and configured to be selectively conformed among a plurality of conformations that includes a sealing conformation and a translation conformation, the actuated fluid seal has an outermost lateral seal-dimension that is greater in the sealing conformation than in the translation conformation; and a fluid seal actuator assembly associated with the actuated fluid seal and configured to selectively and operably transition the actuated fluid seal among the plurality of conformations, the fluid seal actuator assembly comprising an actuator rod and a fluid seal seat mechanically coupled to the actuator rod, wherein the actuated fluid seal is mechanically coupled to the fluid seal seat.

15. The liquid shim injection device of claim 14, further comprising a fluid barrier operably coupled to the body and configured to form a flow barrier.

16. The liquid shim injection device of claim 15, wherein the fluid-permeable region is positioned between the fluid barrier and the actuated fluid seal.

17. The liquid shim injection device of claim 14, wherein the injection shaft comprises an outermost lateral shaft-dimension, wherein the outermost lateral seal-dimension is greater than the outermost lateral shaft-dimension when the actuated fluid seal is in the sealing conformation.

18. The liquid shim injection device of claim 14, wherein the actuated fluid seal comprises a resilient body, and wherein the fluid seal actuator assembly is configured to selectively deform the resilient body to selectively and operably transition the actuated fluid seal among the plurality of conformations.

19. The liquid shim injection device of claim 18, wherein the injection shaft comprises an outermost lateral shaft-dimension, wherein the outermost lateral seal-dimension is greater than the outermost lateral shaft-dimension when the actuated fluid seal is in the sealing conformation, wherein the resilient body defines the outermost lateral seal-dimension, and wherein the resilient body is configured to be selectively deformed to change the outermost lateral seal-dimension of the actuated fluid seal.

20. The liquid shim injection device of claim 14, wherein the fluid seal actuator assembly is configured to permit actuation of the actuated fluid seal from a proximal end region of the liquid shim injection device.

21. The liquid shim injection device of claim 14, wherein the fluid-permeable region forms a cylindrical annulus about the injection shaft.

22. The liquid shim injection device of claim 14, wherein the fluid-permeable region is configured to extrude the liquid shim material in an outward direction from the injection shaft towards the exterior to the injection shaft.

23. The liquid shim injection device of claim 14, further comprising a liquid shim delivery system that is in fluid communication with the liquid shim conduit and configured to selectively and operably provide the liquid shim material to the liquid shim conduit.

24. The liquid shim injection device of claim 23, wherein the liquid shim delivery system is configured to selectively flow the liquid shim material to the liquid shim conduit to selectively extrude the liquid shim material from the fluid-permeable region.

25. The liquid shim injection device of claim 14, wherein the liquid shim injection device is configured to be at least one of mounted to, mounted with, or mounted as an end effector of a robotic arm or robotic device.

* * * * *